United States Patent
Adjakple et al.

(10) Patent No.: US 11,889,514 B2
(45) Date of Patent: Jan. 30, 2024

(54) SIDELINK BUFFER STATUS REPORTS AND SCHEDULING REQUESTS FOR NEW RADIO VEHICLE SIDELINK SHARED CHANNEL DATA TRANSMISSIONS

(71) Applicant: InterDigital Patent Holdings, Inc., Wilmington, DE (US)

(72) Inventors: Pascal M. Adjakple, Great Neck, NY (US); Qing Li, Princeton Junction, NJ (US); Joseph M. Murray, Schwenksville, PA (US); Lakshmi R. Iyer, King of Prussia, PA (US); Mohamed Awadin, Plymouth Meeting, PA (US); Yifan Li, Conshohocken, PA (US); Allan Y. Tsai, Boonton, NJ (US); Guodong Zhang, Woodbury, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 141 days.

(21) Appl. No.: 17/254,106

(22) PCT Filed: Jun. 28, 2019

(86) PCT No.: PCT/US2019/039780
§ 371 (c)(1),
(2) Date: Dec. 18, 2020

(87) PCT Pub. No.: WO2020/006388
PCT Pub. Date: Jan. 2, 2020

(65) Prior Publication Data
US 2021/0274545 A1 Sep. 2, 2021

Related U.S. Application Data

(60) Provisional application No. 62/804,928, filed on Feb. 13, 2019, provisional application No. 62/691,300, filed on Jun. 28, 2018.

(51) Int. Cl.
H04W 72/14 (2009.01)
H04W 72/04 (2023.01)
(Continued)

(52) U.S. Cl.
CPC ....... *H04W 72/23* (2023.01); *H04W 28/0268* (2013.01); *H04W 28/0278* (2013.01); *H04W 72/21* (2023.01); *H04W 4/40* (2018.02)

(58) Field of Classification Search
None
See application file for complete search history.

(56) References Cited

U.S. PATENT DOCUMENTS

| 2008/0002658 A1 | 1/2008 | Soliman |
| 2012/0077510 A1 | 3/2012 | Chen et al. |

(Continued)

FOREIGN PATENT DOCUMENTS

| JP | 2015-050529 A | 3/2015 |
| JP | 2017-175348 A | 9/2017 |

(Continued)

*Primary Examiner* — Steve R Young
(74) *Attorney, Agent, or Firm* — BakerHostetler

(57) ABSTRACT

Sidelink communication operations may be enhanced through the use of communications requirement signaling, which may include, for example, indications of the type, size, quality of service requirements, pending buffer sizes, and the like, and through the evaluation of such signaled information to determine whether existing grants and logical channels may suffice for new sidelink traffic. Grants may be requested via sidelink scheduling requests and sidelink buffer status reporting, for example, which allow scheduling devices, such as base stations and scheduling user equipment apparatuses, early insight into needs of sidelink traffic for application with divergent QoS requirements.

16 Claims, 27 Drawing Sheets

(51) Int. Cl.
*H04W 28/02* (2009.01)
*H04W 72/23* (2023.01)
*H04W 72/21* (2023.01)
*H04W 4/40* (2018.01)

(56) References Cited

U.S. PATENT DOCUMENTS

| | | |
|---|---|---|
| 2013/0308549 A1 | 11/2013 | Madan et al. |
| 2013/0322413 A1* | 12/2013 | Pelletier ............... H04W 76/14 |
| | | 370/336 |
| 2014/0023008 A1* | 1/2014 | Ahn ...................... H04L 5/006 |
| | | 370/329 |
| 2016/0323869 A1* | 11/2016 | Xu ..................... H04W 72/085 |
| 2016/0338095 A1* | 11/2016 | Faurie ............... H04W 28/0278 |
| 2017/0013598 A1* | 1/2017 | Jung ..................... H04W 72/04 |
| 2017/0238357 A1 | 8/2017 | Morita et al. |
| 2017/0285105 A1* | 10/2017 | Uemura ............. H04L 12/5692 |
| 2017/0303319 A1 | 10/2017 | Han |
| 2017/0353819 A1 | 12/2017 | Yin et al. |
| 2018/0070264 A1* | 3/2018 | Saiwai ................... H04W 72/04 |
| 2019/0090250 A1* | 3/2019 | Lee ....................... H04W 72/02 |
| 2019/0254059 A1* | 8/2019 | Gulati ................... H04W 72/21 |
| 2020/0029353 A1* | 1/2020 | Xu ..................... H04W 52/0209 |
| 2020/0100088 A1* | 3/2020 | Kim ..................... H04W 48/16 |
| 2021/0022131 A1* | 1/2021 | Liu ..................... H04W 72/085 |
| 2021/0274545 A1* | 9/2021 | Adjakple ............. H04W 72/21 |
| 2022/0264624 A1* | 8/2022 | Baek .................... H04W 72/21 |

FOREIGN PATENT DOCUMENTS

| | | |
|---|---|---|
| JP | 2017-220931 A | 12/2017 |
| JP | 2018-500846 A | 1/2018 |
| WO | 2014/209077 A1 | 12/2014 |
| WO | 2016/025163 A1 | 2/2016 |
| WO | 2016/047261 A1 | 3/2016 |
| WO | 2017/188872 A1 | 11/2017 |
| WO | 2017/194212 A1 | 11/2017 |

* cited by examiner

| Destination index$_1$ | LCG ID$_1$ | Buffer Size$_1$ | Oct 1 |
| Buffer Size$_1$ | | | Oct 2 |
| LCG ID$_2$ | | | Oct 3 |
| ... | | | |
| Destination index$_{N-1}$ | LCG ID$_{N-1}$ | Buffer Size$_{N-1}$ | Oct 1.5*N-2 |
| Buffer Size$_{N-1}$ | | | Oct 1.5*N-1 |
| LCG ID$_N$ | | | Oct 1.5*N |

Figure 3

| Destination index$_1$ | LCG ID$_1$ | Buffer Size$_1$ | Oct 1 |
| Buffer Size$_1$ | | | Oct 2 |
| LCG ID$_2$ | Destination index$_2$ | | Oct 3 |
| Buffer Size$_2$ | | | |

...

| Destination index$_N$ | LCG ID$_N$ | Buffer Size$_N$ | Oct 1.5*N−0.5 |
| Buffer Size$_N$ | R | R | R | Oct 1.5*N+0.5 |

Figure 4

| | |
|---|---|
| Destination index$_1$ | Oct 1 |
| Buffer Size$_1$ | |
| LCG ID$_1$ | Oct 2 |
| Buffer Size$_1$ | |
| Dup. Buffer Size$_1$ | Oct 3 |
| Destination index$_2$ | |
| Buffer Size$_2$ | Oct 4 |
| LCG ID$_2$ | |
| Buffer Size$_2$ | Oct 5 |
| Dup. Buffer Size$_2$ | |
| Dup. Buffer Size$_2$ | Oct 6 |
| Destination index$_3$ | |
| Buffer Size$_3$ | Oct 7 |
| LCG ID$_3$ | |
| Buffer Size$_3$ | Oct 8 |
| Dup. Buffer Size$_3$ | |
| Dst. index$_4$ | Oct 9 |
| Dst. index$_4$ | |
| LCG ID$_4$ | |
| Buffer Size$_4$ | |
| Buffer Size$_4$ | |
| Dup. Buffer Size$_4$ | |
| ⋮ | |
| Dup. Buffer Size$_{N-1}$ | Oct 2.25*N-2 |
| Dst. index$_N$ | |
| Dst. index$_N$ | Oct 2.25*N-1 |
| LCG ID$_N$ | |
| Buffer Size$_N$ | Oct 2.25*N |
| Buffer Size$_N$ | |
| Dup. Buffer Size$_N$ | |

Figure 8

| | |
|---|---|
| Destination index$_1$ | Oct 1 |
| LCG ID$_1$ / Buffer Size$_1$ | Oct 2 |
| Buffer Size$_1$ / Dup. Buffer Size$_1$ | Oct 3 |
| Dup. Buffer Size$_1$ / Destination index$_2$ | Oct 4 |
| Buffer Size$_2$ / LCG ID$_2$ | Oct 5 |
| Dup. Buffer Size$_2$ / Destination index$_3$ | Oct 6 |
| Buffer Size$_3$ | Oct 7 |
| Dup. Buffer Size$_3$ / Dst. index$_4$ | Oct 8 |
| Dst. index$_4$ / LCG ID$_4$ / Buffer Size$_4$ / Dup. Buffer Size$_4$ | Oct 9 |

...

| | |
|---|---|
| Dup. Buffer Size$_{N-1}$ / Destination index$_N$ | Oct 2.25*N-1.75 |
| LCG ID$_N$ / Buffer Size$_N$ | Oct 2.25*N-0.75 |
| Dup. Buffer Size$_N$ / R / R | Oct 2.25*N+0.25 |

Figure 9

| | |
|---|---|
| Destination index$_1$ | LCG ID$_1$ | Buffer Size$_1$ | Oct 1
| Buffer Size$_1$ | Dup. Buffer Size$_1$ | Oct 2
| Dup. Buffer Size$_1$ | Destination index$_2$ | LCG ID$_2$ | Oct 3
| Buffer Size$_2$ | Dup. Buffer Size$_2$ | Oct 4
| Dup. Buffer Size$_2$ | Destination index$_3$ | Oct 5
| LCG ID$_3$ | Buffer Size$_3$ | Oct 6
| Dup. Buffer Size$_3$ | Dst. index$_4$ | Oct 7
| Dst. index$_4$ | LCG ID$_4$ | Buffer Size$_4$ | Oct 8
| Buffer Size$_4$ | Dup. Buffer Size$_4$ | Oct 9

⋮

| Dup. Buffer Size$_{N-1}$ | Destination index$_{N-1}$ | LCG ID$_N$ | Oct 2.25*N−1.5
| Buffer Size$_N$ | Dup. Buffer Size$_N$ | Oct 2.25*N−0.5
| Dup. Buffer Size$_N$ | R | R | R | Oct 2.25*N+0.5

Figure 10

| Destination index₁ | LCG ID₁ | Buffer Size₁ | Oct 1 |
| Buffer Size₁ | | | Oct 2 |
| Dup. Buffer Size₁ | Destination index₂ | LCG ID₂ | Oct 3 |
| Buffer Size₂ | | Dup. Buffer Size₂ | Oct 4 |
| Dup. Buffer Size₂ | Destination index₃ | | Oct 5 |
| LCG ID₃ | Buffer Size₃ | | Oct 6 |
| Dup. Buffer Size₃ | | | Oct 7 |
| Dst. index₄ | LCG ID₄ | Buffer Size₄ | Oct 8 |
| Buffer Size₄ | Dup. Buffer Size₄ | | Oct 9 |

⋮

| Destination index_N | LCG ID_N | Buffer Size_N | | | Oct 2.25*N−1.25 |
| Buffer Size_N | | Dup. Buffer Size_N | | | Oct 2.25*N−0.25 |
| Dup. Buffer Size₁ | R | R | R | R | Oct 2.25*N+0.75 |

Figure 11

|  | Oct 1 | Oct 2 | Oct 3 | Oct 4 | Oct 5 | Oct 6 | Oct 7 | Oct 8 |
|---|---|---|---|---|---|---|---|---|
| Destination index$_1$ | LCG ID$_1$ | Buffer Size$_1$ | | | | | | |
| Buffer Size$_1$ | D$_1$ | Dup. Buffer Size$_1$ | | | | | | |
| Dup. Buffer Size$_1$ | Destination index$_2$ | LCG ID$_2$ | | | | | | |
| LCG ID$_2$ | Buffer Size$_2$ | D$_2$ | | | | | | |
| Destination index$_3$ | LCG ID$_3$ | Buffer Size$_3$ | | | | | | |
| Buffer Size$_3$ | D$_3$ | Dup. Buffer Size$_3$ | | | | | | |
| Dup. Buffer Size$_3$ | Destination index$_4$ | LCG ID$_4$ | | | | | | |
| LCG ID$_4$ | Buffer Size$_4$ | D$_4$ | | | | | | |

Figure 12

| Destination index$_1$ | LCG ID$_1$ | Dup. Buffer Size$_1$ | Oct 1 |
|---|---|---|---|
| Dup. Buffer Size$_1$ | | | Oct 2 |
| Duplication Buffer Size$_2$ | Destination index$_2$ | | Oct 3 |
| LCG ID$_2$ | | | |
| ⋮ | | | |
| Destination index$_N$ | LCG ID$_N$ | Dup. Buffer Size$_N$ | Oct 1.5*N−0.5 |
| Dup. Buffer Size$_N$ | R | R | Oct 1.5*N+0.5 |

Figure 14

SIDELINK BUFFER STATUS REPORTS AND SCHEDULING REQUESTS FOR NEW RADIO VEHICLE SIDELINK SHARED CHANNEL DATA TRANSMISSIONS

CROSS-REFERENCE TO RELATED APPLICATIONS

This application is the National Stage of International Patent Application No. PCT/US2019/039780, filed Jun. 28, 2019, which claims the benefit of U.S. Provisional Application Nos. 62/691,300 filed Jun. 28, 2018 and 62/804,928 filed Feb. 13, 2019, both entitled "Sidelink buffer status reports and scheduling requests for new radio vehicle sidelink shared channel data transmissions," the content of which are hereby incorporated by reference in their entirety.

BACKGROUND

This disclosure pertains to mobile communications involving objects such as vehicles. See, for example, 3GPP TR 22.886, Study on enhancement of 3GPP Support for 5G V2X Services; (Release 15), V15.1.0; 3GPP TS 22.186, Enhancement of 3GPP support for V2X scenarios; Stage 1 (Release 15), V15.2.0; 3GPP TS 36.321, E-UTRA Medium Access Control (MAC) protocol specification (Release 15), V15.1.0; 3GPP TS 36.300, Overall description; Stage 2 (Release 15), V15.1.0; 3GPP TS 24.386: User Equipment (UE) to V2X control function; protocol aspects; Stage 3 (Release 14), V14.3.0; 3GPP TS 38.321, NR Medium Access Control (MAC) protocol specification (Release 15), V15.0.0; 3GPP R2-1809292, Introduction of V2X duplication to TS 36.323, CATT; 3GPP TS 36.331, Radio Resource Control (RRC); Protocol specification (Release 15), V15.1.0; and 3GPP TR 38.885, NR; Study on Vehicle-to-Everything, V1.0.0.

SUMMARY

Sidelink communication operations may be enhanced through the use of communications requirement signaling, which may include, for example, indications of the type, size, quality of service requirements, pending buffer sizes, and the like, and through the evaluation of such signaled information. For example, a first apparatus may determine whether conditions for requesting a resource grant are met before sending, to a second apparatus, a first request for a sidelink communications resource grant for communications between the first apparatus and the third apparatus. The first and third apparatuses may be user equipments (UEs), for example. The second apparatus may be a base station, such as a gNB, for example, or another apparatus acting as a scheduler. For example, the second apparatus may be a UE which is acting as a vehicle group leader. The criteria for determining whether to send the request may involve an evaluation of existing grants and logical channels, and the characteristics of those grants and logical channels vis-a-vis various types of data likely to be carried in the sidelink. The request may include a status of data buffered for transmission between the first apparatus and the third apparatus. The request may additionally or alternatively carry a destination layer-2 identity of one or more of the apparatuses, an identity of a logical channel, a logical channel group of a buffer, a buffer size, and a duplicate buffer size. The request may take the form of a Buffer Status Report (BSR) for sidelink communications, for example, which is conveyed via a Medium Access Control (MAC) Control Element.

The first apparatus may send status information to the second apparatus, such as communication activity, load status, channel conditions, and distance, and may receive configuration information from the second apparatus pertaining to the first apparatus acting as a relay for sidelink communications resource grant requests from other devices, e.g., from a fourth apparatus. For example, the first apparatus may receive one or more requests for a sidelink communications resource grant from the fourth apparatus, and then verify that it is configured to relay the one or more requests for a sidelink communications resource grant from the fourth apparatus. If verification is successful, the first apparatus may relay the requests for a sidelink communications resource grant from the fourth apparatus to the second apparatus.

The request may take the form of a Scheduling Request (SR) for sidelink communications. Signaling between the first apparatus and the second apparatus may include configuration information for sidelink scheduling request operations, including, for example, opportunities for sidelink SR and buffer status communications, such as a configuration of polled or periodic sidelink communications resource grant request opportunities.

The criteria for determining whether to send the request may include, inter alia, Quality of Service (QoS) level information for each of a plurality of QoS levels required for communication between the first apparatus and the third apparatus. For example, an existing grant may not be suitable for meeting latency or redundancy requirements of data which otherwise shares a nominal priority level with an existing grant or logical channel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with accompanying figures. The figures are not necessarily drawn to scale.

FIG. 3 illustrates an example sidelink Buffer Status Report (BSR) and truncated sidelink BSR Medium Access Control (MAC) control element for even N.

FIG. 4 illustrates an example sidelink BSR and truncated sidelink BSR MAC control element for odd N.

FIG. 8 illustrates an example sidelink BSR and truncated sidelink BSR MAC CE for N mod 4=0.

FIG. 9 illustrates an example sidelink BSR and truncated sidelink BSR MAC CE for N mod 4=3.

FIG. 10 illustrates an example sidelink BSR and truncated sidelink BSR MAC CE for N mod 4=2.

FIG. 11 illustrates an example sidelink BSR and truncated sidelink BSR MAC CE for N mod 4=1.

FIG. 12 illustrates an example sidelink BSR and truncated sidelink BSR MAC CE with Optional Reporting of duplication Buffer Size Field.

FIG. 14 illustrates an example sidelink duplication BSR and truncated sidelink duplication BSR MAC CE for Odd N.

Figure

DETAILED DESCRIPTION

Figure 1:
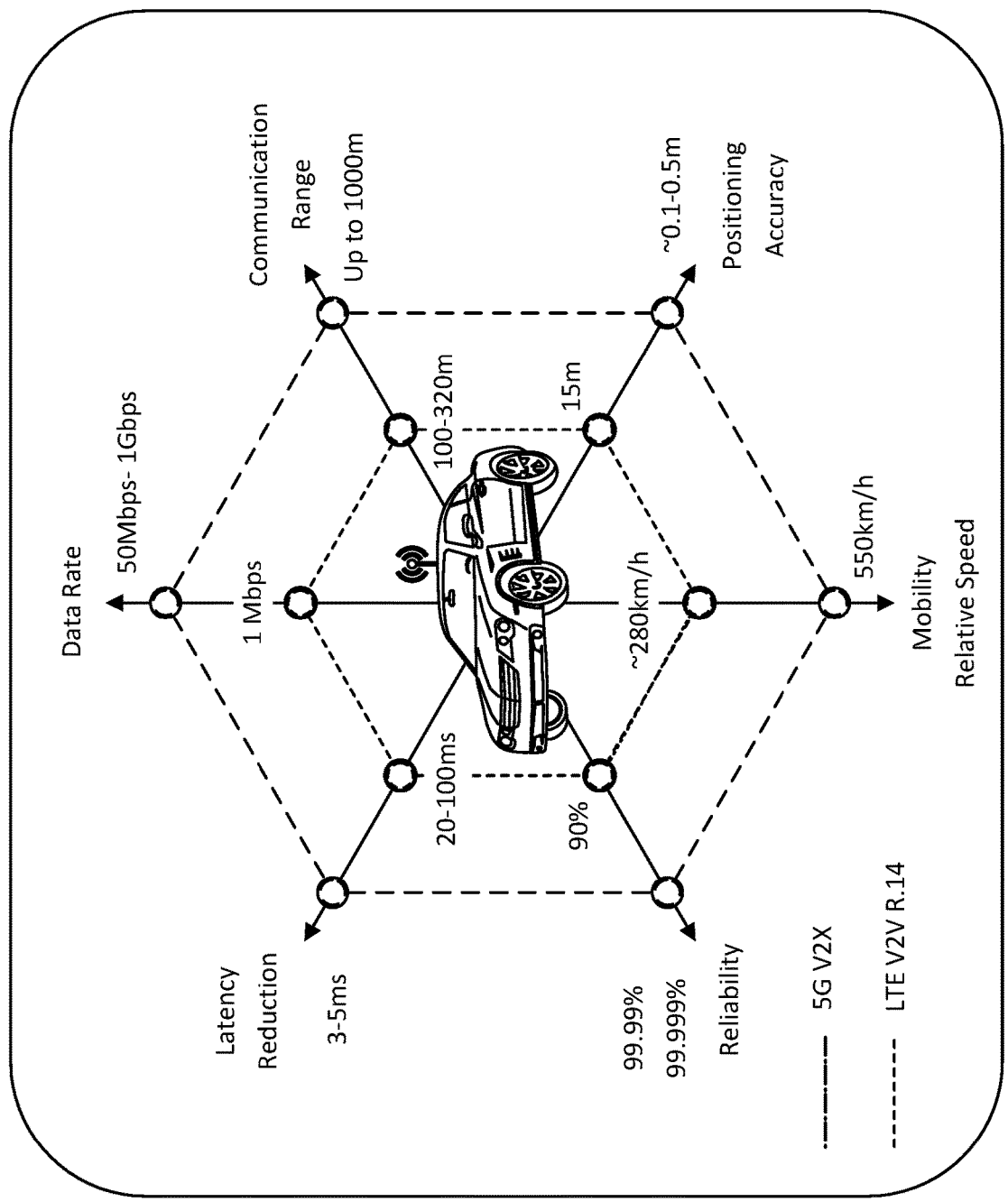
FIG. 1 illustrates example 5G V2X versus LTE V2V R14 requirements.

Table 1 contains a number of abbreviations used herein.

TABLE 1

| Abbreviations | |
|---|---|
| 3GPP | 3$^{rd}$ Generation Partnership Project |
| BSR | Buffer Status Report |
| BWP | Bandwidth Part |
| CE | Control Element |
| C-RNTI | Cell Radio Network Temporary Identifier |
| eNB | Evolved Node B |
| eV2X | Enhanced Vehicle-to-X Communication |
| E-UTRAN | Evolved UMTS Terrestrial Radio Access Network |
| gNB | NR NodeB |
| HARQ | Hybrid Automatic Repeat Request |
| HSS | Home Subscriber Server |
| ITS | Intelligent Transport System |
| ITS-AID | ITS Application Identifier |
| LCG | Logical Channel Group |
| LCH | Logical Channel |
| LCID | Logical Channel Identity |
| LCP | Logical Channel Prioritization |
| LTE | Long Term Evolution |
| MAC | Medium Access Control |

TABLE 1-continued

| Abbreviations | |
|---|---|
| MME | Mobility Management Entity |
| NR | New Radio |
| P2X | Pedestrian-to-X Communication |
| PBR | Prioritized Bit Rate |
| PDB | Packet Delay Budget |
| PDCP | Packet Data Convergence Protocol |
| PDN | Packet Data Network |
| PDU | Protocol Data Unit |
| P-GW | PDN Gateway |
| PHR | Power Headroom Report |
| PLMN | Public Land Mobile Network |
| PPPP | Prose Per Packet Priority |
| PPPR | ProSe Per Packet Reliability |
| ProSe | Proximity-Based Services |
| PSID | Provider Service Identifier |
| PUCCH | Physical Uplink Control Channel |
| QoS | Quality of Service |
| S-GW | Serving Gateway |
| SL | Sidelink |
| SR | Scheduling Request |
| RAN | Radio Access Network |
| RAT | Radio Access Technology |
| RLC | Radio Link Control |
| RNTI | Radio Network Temporary Identifier |
| RRC | Radio Resource Control |
| RSU | Roadside Unit |
| SCI | Sidelink Control Information |
| SDU | Service Data Unit |
| SL-SCH | Sidelink Shared Channel |
| TTI | Transmission Time Interval |
| UCI | Uplink Control Information |
| UE | User Equipment |
| UL | Uplink |
| UL-SCH | Uplink Shared Channel |
| UMTS | Universal Mobile Telecommunications System |
| URLLC | Ultra-Reliable and Low Latency Communications |
| USIM | Universal Subscriber Identity Module |
| UTRA | UMTS Terrestrial Radio Access |
| Uu | User equipment to UTRA |
| V2I | Vehicle-to-Infrastructure Communication |
| V2N | Vehicle-to-Network Communication |
| V2P | Vehicle-to-Pedestrian Communication |
| V2V | Vehicle-to-Vehicle Communication |
| V2X | Vehicle-to-X Communication |

Herein, the terms V2X service, V2X message, and V2X application data packet are used interchangeably. Herein the terms "method" and "procedure" are used interchangeably to describe ways in which devices may be operated using to achieve certain results. Neither term is meant to imply a rigid order of operations, or to exclude the interoperation of the many techniques described herein. It will be appreciated that the operations described herein may be executed in a variety of combinations and sequences.

New Radio V2X Key Use Cases and Requirements

SA1 has identified a number of use cases for advanced V2X services for applications in the automotive industry. See 3GPP TR 22.886, Study on enhancement of 3GPP Support for 5G V2X Services; (Release 15), V15.1.0. These use cases for advanced V2X services are categorized into four use case groups: vehicle platooning, extended sensors, advanced driving, and remote driving.

Vehicle platooning enables the vehicles to dynamically form a platoon travelling together. All the vehicles in the platoon obtain information from the leading vehicle to manage this platoon. This information allow the vehicles to drive closer than normal in a coordinated manner, going to the same direction and travelling together.

Extended sensors enable the exchange of raw or processed data gathered through local sensors or live video images among vehicles, road site units, devices of pedestrian, and V2X application servers. The vehicles can increase the perception of their environment beyond of what their own sensors can detect and have a more broad and holistic view of the local situation. High data rate is one of the key characteristics.

Advanced driving enables semi-automated or full-automated driving. Each vehicle and/or Road Side Unit (RSU) shares its own perception data obtained from its local sensors with vehicles in proximity. This allows vehicles to synchronize and coordinate their trajectories or maneuvers. Each vehicle also shares its driving intentions with vehicles in proximity.

Remote driving enables a remote driver or a V2X application to operate a remote vehicle for those passengers who cannot drive by themselves, or for remote vehicles located in dangerous environments, for example. For a case where variation is limited and routes are predictable, such as public transportation, driving based on cloud computing can be used. High reliability and low latency are the main requirements.

The 5G eV2X requirements and LTE V2X requirements are shown in FIG. 1. See 3GPP TS 22.186, Enhancement of 3GPP support for V2X scenarios; Stage 1 (Release 15), V15.2. The 5G eV2X target data rate is about hundred times higher than the LTE V2V Rel-14 data rate, e.g., at 1 Gbps versus 1-10 Mbps in LTE. Similarly, the 5G eV2X target end-to-end latency is five to twenty times lower than that of LTE Rel-14 V2V, e.g., a latency reduction from a range of 20-100 ms in LTE to a range of 3-5 ms in 5G. The 5G eV2X target communication range is two to three times larger than that of LTE Rel-14 V2X e.g., an increase in communication range from a range of 100-320 m to 1000 m or above. The 5G eV2X positioning target accuracy is ten times higher than that of LTE Rel-14 V2X, e.g., an accuracy increase from a range of 5-15 m in LTE to a range of 0.1-0.5 m in 5G. Similarly, the 5G eV2X target relative vehicle is twice higher than that of LTE Rel-14 V2V e.g., an increase in target relative speed from 280 km/h to 550 km/h. In the same way, the 5G eV2X target reliability is 1000 times higher than that of LTE V2V, e.g., an increase in reliability requirement from 90% to 99.99% or more.

LTE V2X Reference Architecture

Figure 2:
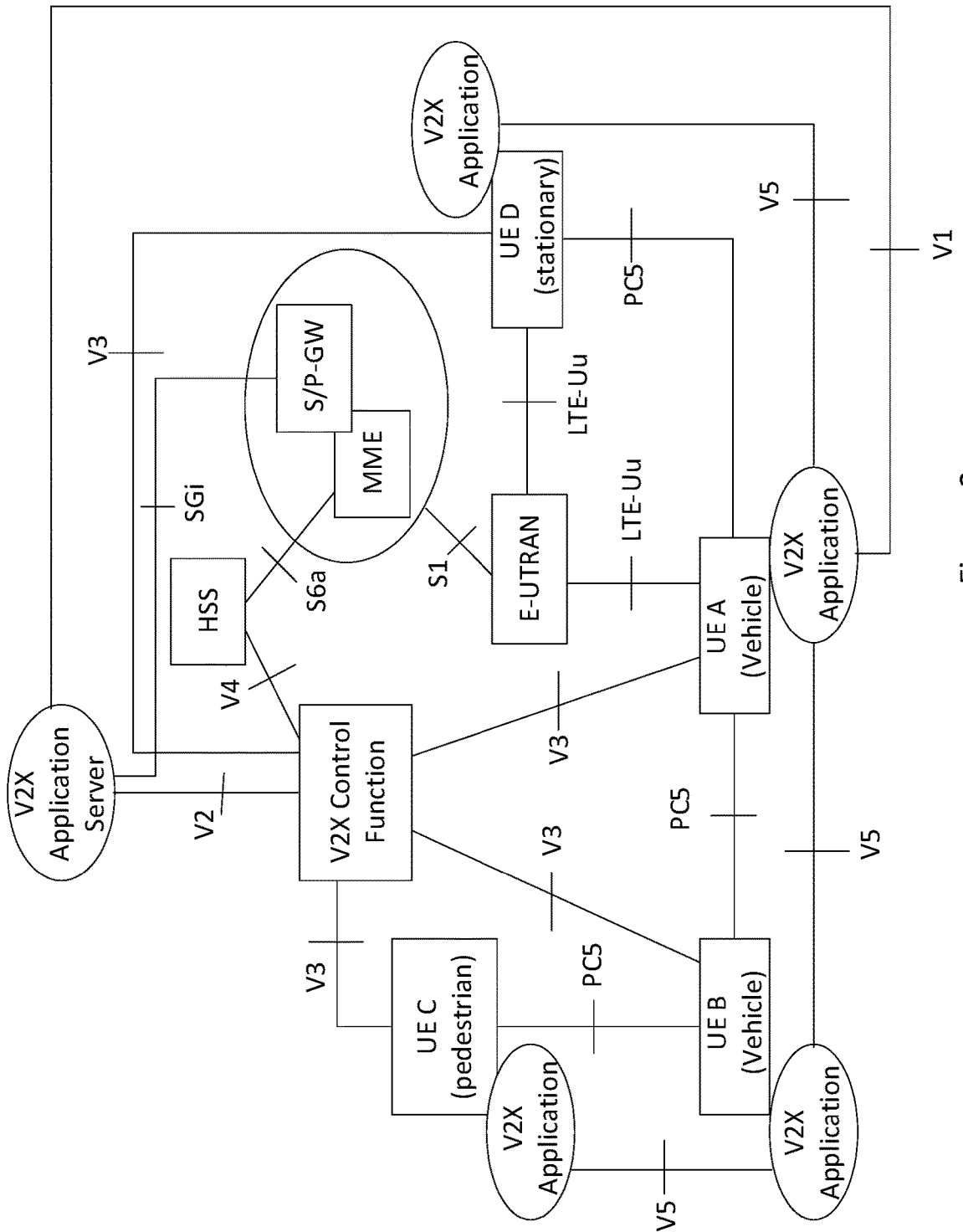
FIG. 2 illustrates an example non-roaming reference architecture for PC5 and LTE-Uu based V2X communication.

FIG. 2 shows a high level view of an example non-roaming architecture for PC5 and LTE-Uu based V2X communication. The V2X Control Function is a logical function that is used for network related actions required for V2X. The V2X Control Function is used to provision the UE with parameters for V2X communication, such as destination Layer-2 IDs, radio resource parameters, V2X Application Server address information, mapping between service types, and V2X frequencies. These parameters can be pre-configured in the UE, or, if in coverage, provisioned by signaling over the V3 reference point from the V2X Control Function in the Home Public Land Mobile Network (HPLMN). The UE may exchange V2X control information with the V2X Control Function over the V3 reference point.

When PC5 is used for the transmission of V2X messages, several principles are followed for both network scheduled operation mode (e.g., mode 3) and UE autonomous resources selection mode (e.g., mode 4). ProSe Per-Packet Priority (PPPP) applies to the V2X communication over PC5. The application layer sets the PPPP for each V2X message when passing it to lower layer for transmission. The mapping of application layer V2X message priority to PPPP is configured on the UE. The setting of the PPPP value should reflect the latency required in both UE and eNB, e.g., the low Packet Delay Budget (PDB) is mapped to the high priority PPPP value. There is a mapping between V2X service types and V2X frequencies. There is a mapping of Destination Layer-2 ID(s) and the V2X services, e.g., PSID or ITS-AIDs of the V2X application. There is a mapping of PPPP to packet delay budget.

When the network scheduled operation mode is used, additional principles apply. The UE provides priority information reflecting PPPP to the eNB for resources request. When the eNB receives a request for PC5 resource from a UE, the eNB can deduce the packet delay budget from the priority information reflecting PPPP from the UE. An eNB can use the priority information reflecting PPPP for priority handling and UE-PC5-AMBR for capping the UE PC5 transmission in the resources management. The UE provides Destination Layer-2 ID(s) of the V2X services to the eNB for resources requested as defined in 3GPP TS 36.321, E-UTRA Medium Access Control (MAC) protocol specification (Release 15), V15.1.0. When the eNB receives a request for PC5 resource from a UE, the eNB determines the V2X frequencies in which the V2X service is to be scheduled as defined in 3GPP TS 36.300, Overall description; Stage 2 (Release 15), V15.1.0.

When the autonomous resources selection mode is used, additional principle apply. The UE derives the packet delay budget of the V2X message from PPPP based on the provisioned mapping information. The UE derives the frequency in which a V2X service is to be transmitted, from the mapping between V2X service types and V2X frequencies.

Sidelink HARQ Operation

Figure 2A:
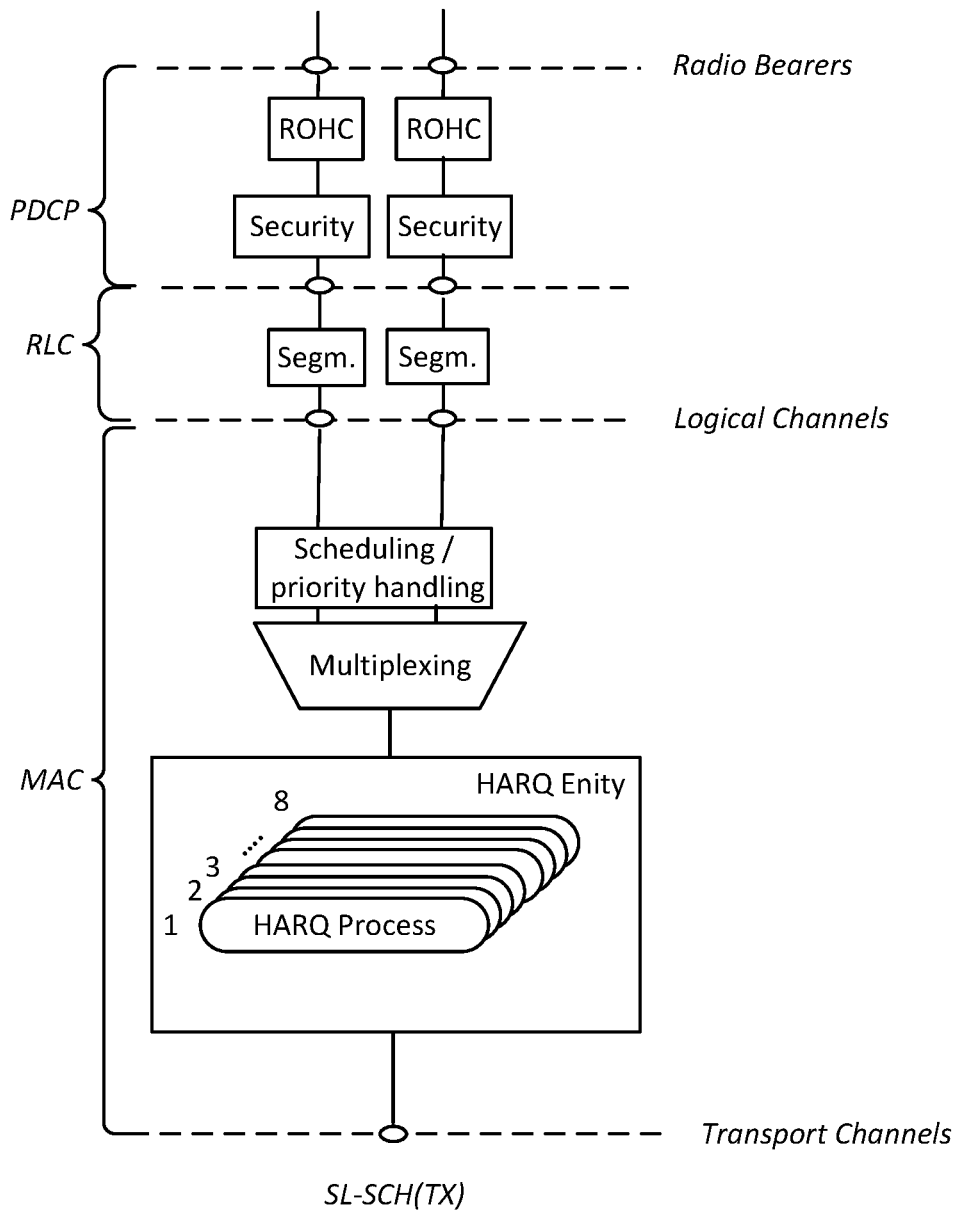
FIG. 2A illustrates an example Layer 2 structure for SL-SCH transmission.

In legacy systems, there is one Sidelink HARQ Entity at the MAC entity for transmission on SL-SCH, which maintains a number of parallel Sidelink processes. See FIG. 2A.

For V2X sidelink communication, the maximum number of transmitting Sidelink processes associated with the Sidelink HARQ Entity is 8. A sidelink process may be configured for transmissions of multiple MAC PDUs. For transmissions of multiple MAC PDUs, the maximum number of transmitting Sidelink processes with the Sidelink HARQ Entity is 2.

A delivered and configured sidelink grant and its associated HARQ information are associated with a Sidelink process.

The Sidelink process is associated with a HARQ buffer.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

The transmission of V2X sidelink communication is prioritized over uplink transmission if certain conditions are met: the MAC entity is not able to perform uplink transmissions and transmissions of V2X sidelink communication simultaneously at the time of the transmission; uplink transmission is not prioritized by upper layer according to 3GPP TS 24.386: User Equipment (UE) to V2X control function; protocol aspects; Stage 3 (Release 14), V14.3.0; and the value of the highest priority of the sidelink logical channels in the MAC PDU is lower than thresSL-TxPrioritization if thresSL-TxPrioritization is configured.

Buffer Status Reporting

In LTE and NR, a Buffer Status Report (BSR) procedure over the Uu interface is used to provide the serving LTE eNB or NR gNB in NR with information about the amount of data available for transmission in the UL buffers associated with the MAC entity. Also in LTE, the sidelink Buffer Status reporting procedure is used to provide the serving eNB with information about the amount of sidelink data available for transmission in the SL buffers associated with the MAC entity. RRC controls BSR for the sidelink by configuring the two timers, periodic-BSR-TimerSL and retx-BSR-TimerSL. Each sidelink logical channel belongs to a ProSe Destination. Each sidelink logical channel is allocated to an LCG depending on the priority of the sidelink logical channel and the mapping between LCG ID and priority which is provided by upper layers. LCG is defined per ProSe Destination. A sidelink BSR similar to the Uu interface BSR may be regular BSR, periodic, BSR or padding BSR.

A MAC PDU may contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity may restart rebc-BSR-TimerSL upon reception of an SL grant.

All triggered regular Sidelink BSRs shall be cancelled in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

In LTE, a Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

FIG. 3 and FIG. 4 describe the BSR MAC CEs Sidelink BSR and Truncated Sidelink BSR MAC control elements consist of one Destination Index field, one LCG ID field and one corresponding Buffer Size field per reported target group. The Destination Index field identifies the destination for V2X sidelink communication. The length of this field is 4 bits. The value is set to the index of the destination reported to the eNB in the sidelink UE information message as part of the V2X destination list. The Logical Channel Group ID field identifies the group of logical channel(s) which buffer status is being reported. The length of the field is 2 bits. The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer.

Buffer Sizes of LCGs are included in decreasing order of the highest priority of the sidelink logical channel belonging to the LCG irrespective of the value of the Destination Index field.

In the Rel-15 NR, a condition is defined to delay transmission of SR, when a BSR is triggered and not cancelled, and there is an upcoming UL grant that can be used to transmit the BSR.

This condition has been implemented in the standards as shown with the underlined text in the MAC specification text below.

"The MAC entity shall:
1> if the Buffer Status reporting procedure determines that at least one BSR has been triggered and not cancelled:
   2> if UL-SCH resources are available for a new immediate transmission:
      3> instruct the Multiplexing and Assembly procedure to generate the BSR MAC CE(s);
      3> start or restart periodicBSR-Timer except when all the generated BSRs are long or short Truncated BSRs;
      3> start or restart retxBSR-Timer.
   2> if there is no UL-SCH resource available for a new transmission; or
   2> if the UL-SCH resources available for a new transmission do not meet the LCP mapping restrictions (see subclause 5.4.3.1 of TS 38.321) configured for the LCH(s) that triggered the BSR(s):
      3> if a Regular BSR has been triggered and logicalChannelSR-DelayTimer is not running:
         4> if an uplink grant is not a configured grant or
         4> if the Regular BSR was not triggered for a logical channel for which logical channel SR masking (logicalChannelSR-Mask) is setup by upper layers:
            5> trigger a Scheduling Request."

Scheduling Request in LTE/LTE-A

There is no specific schedule request designed for LTE V2X. LTE V2X sidelink communication scheduling request relies on LTE Uu scheduling request mechanism which is also the baseline for NR Uu scheduling request mechanism.

In NR, the MAC entity may be configured with zero, one, or more SR configurations. See 3GPP TS 38.321, NR Medium Access Control (MAC) protocol specification (Release 15), V15.0.0. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the LCH that triggered the BSR, if such a configuration exists is considered as corresponding SR configuration for the triggered SR. For BSR triggered by the expiry of the BSR retransmission timer, the corresponding SR configuration for the triggered SR is that of the highest priority LCH (if such a configuration exists) that has data available for transmission at the time the BSR is triggered.

RRC may configure a number of parameters for the scheduling request procedure, such as: sr-ProhibitTimer (per SR configuration); sr-TransMax (per SR configuration); and sr-ConfigIndex.

The following UE variable SR_COUNTER (per SR configuration) is used for the scheduling request procedure—

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a BSR MAC Control Element (CE) which contains buffer status up to (and including) the last event that triggered a BSR prior to the MAC PDU assembly. All pending SR(s) shall be cancelled when the UL grant(s) can accommodate all pending data available for transmission.

Only PUCCH resources on a BWP which is active at the time of SR transmission occasion are considered valid.

Packet Duplication

For Rel-15, sidelink packet duplication is supported for V2X sidelink communication and is performed at PDCP layer of the UE. See 3GPP R2-1809292, Introduction of V2X duplication to TS 36.323, CATT. Regarding the sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers. A UE using autonomous resource selection (regardless of its RRC state) can autonomously activate or deactivate sidelink packet duplication based on (pre)configuration. For scheduled resource allocation (mode 3), the eNB is informed of the PPPR information of the V2X transmission requested by the UE. The PPPR information consists of the amount of data associated to one (or more) PPPR values, that the UE has in the buffer, and the destination of the V2X messages associated to one (or more) PPPR values, that the UE has in the buffer.

LTE MAC Design for Sidelink Communication

Figure 5:
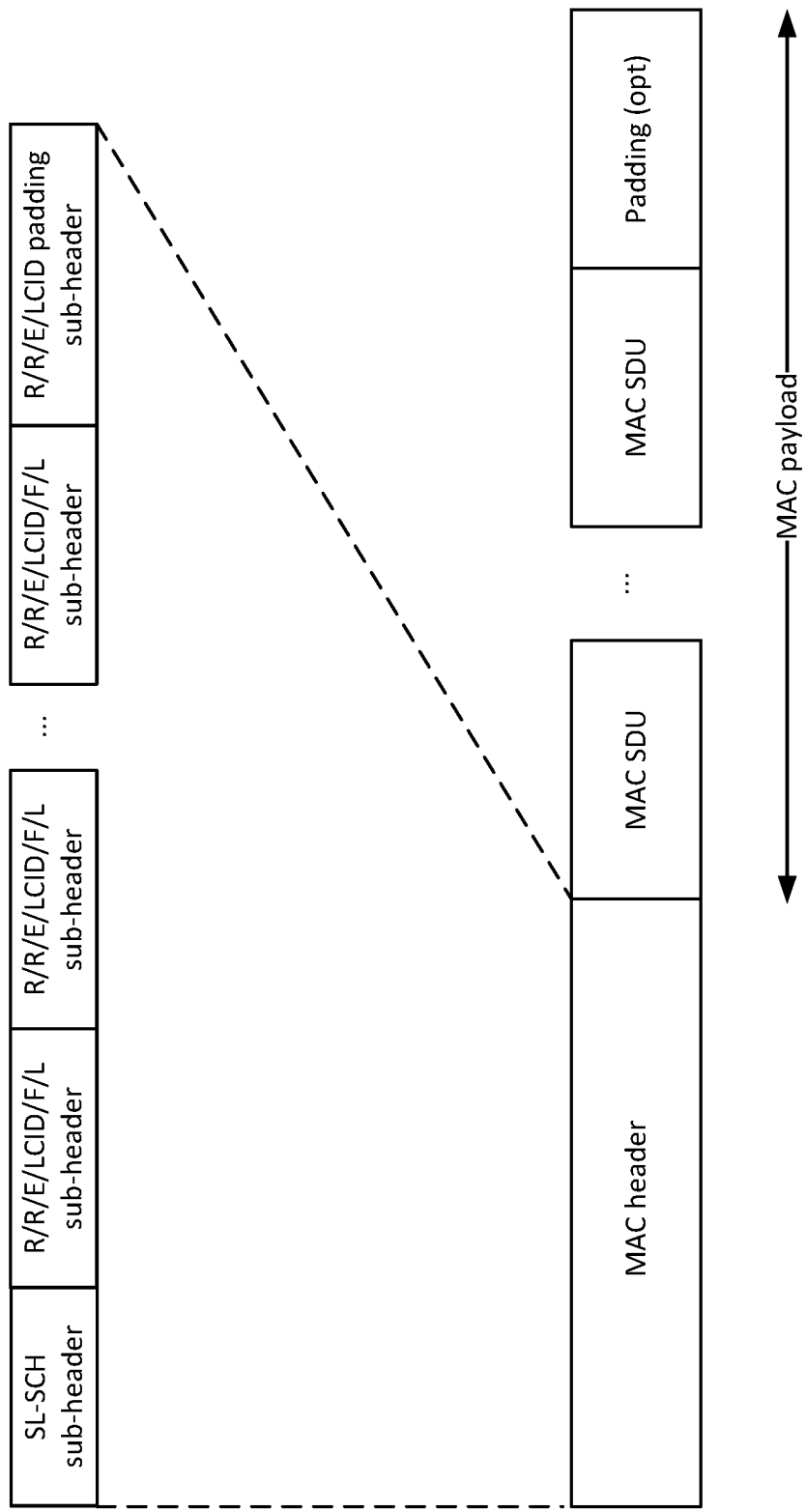
FIG. 5 illustrates an example of MAC PDU consisting of MAC header, MAC SDUs and padding.

For communication over the LTE V2X sidelink the MAC PDU may have a format as shown in FIG. 5, consisting of a MAC header, MAC SDUs, and padding.

A MAC PDU will transmit one or more MAC Service Data Units (SDUs), and will have an optional padding. The MAC PDU will also have a MAC header, which will have a number of MAC PDU sub-headers. The following sub-header types are shown:

SL-SCH subheader: contains the Layer 2 source ID and Layer 2 destination ID

One or more MAC SDU headers: contain information about the MAC SDU (LCID, and length). There is one-to-one link between a MAC SDU sub-header carried in the MAC header, and the MAC SDU carried in the MAC payload.

One Padding Sub-header: contains information about the LCID

The Logical Channel ID (LCID) field in the MAC SDU sub-headers, uniquely identifies the logical channel instance within the scope of one Source Layer-2 ID and Destination Layer-2 ID pair of the corresponding MAC SDU or padding.

Note that the MAC PDU does not contain a MAC Control Elements (CE). As a result, there is no sidelink control signaling, at the MAC level, between peer UEs communicating over the sidelink.

NR Uu MAC Protocol Data Unit Structure

Figure 6:
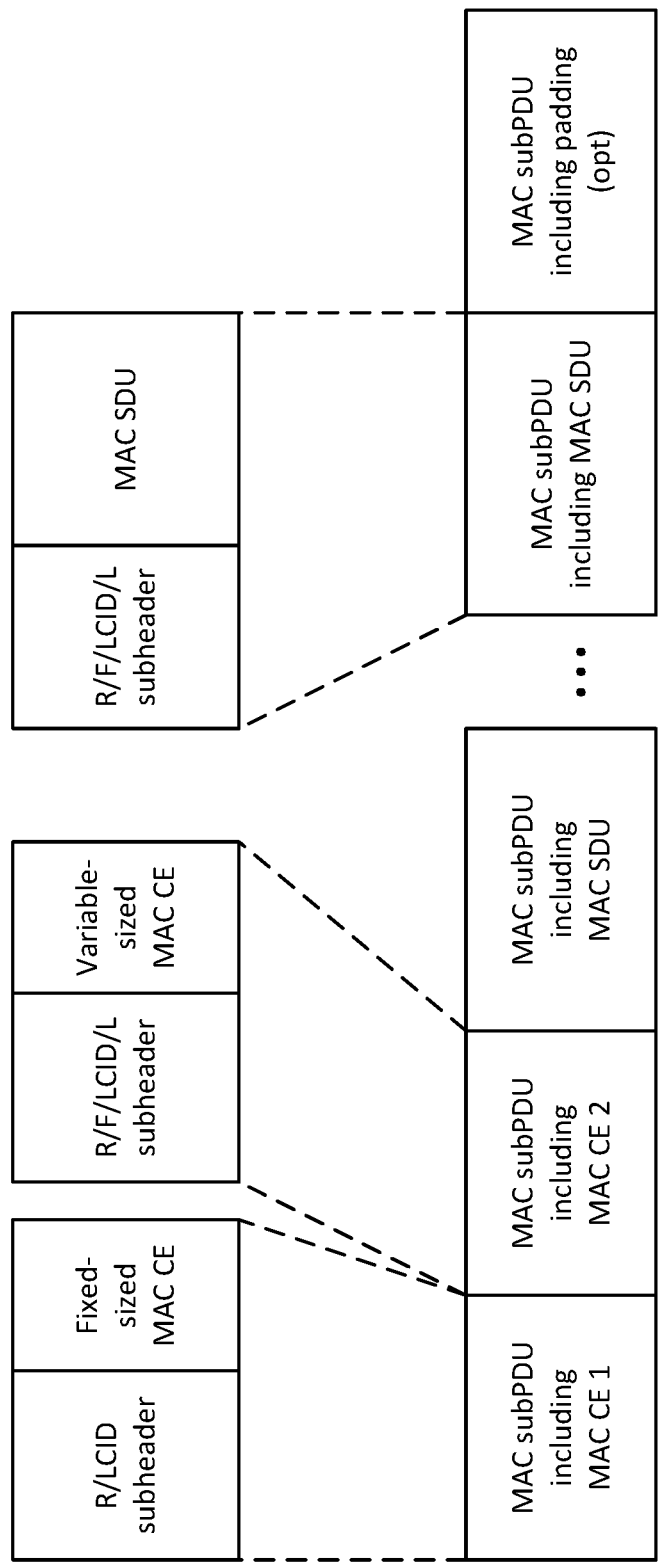
FIG. 6 illustrates an example of NR Uu MAC PDU Downlink.
Figure 7:
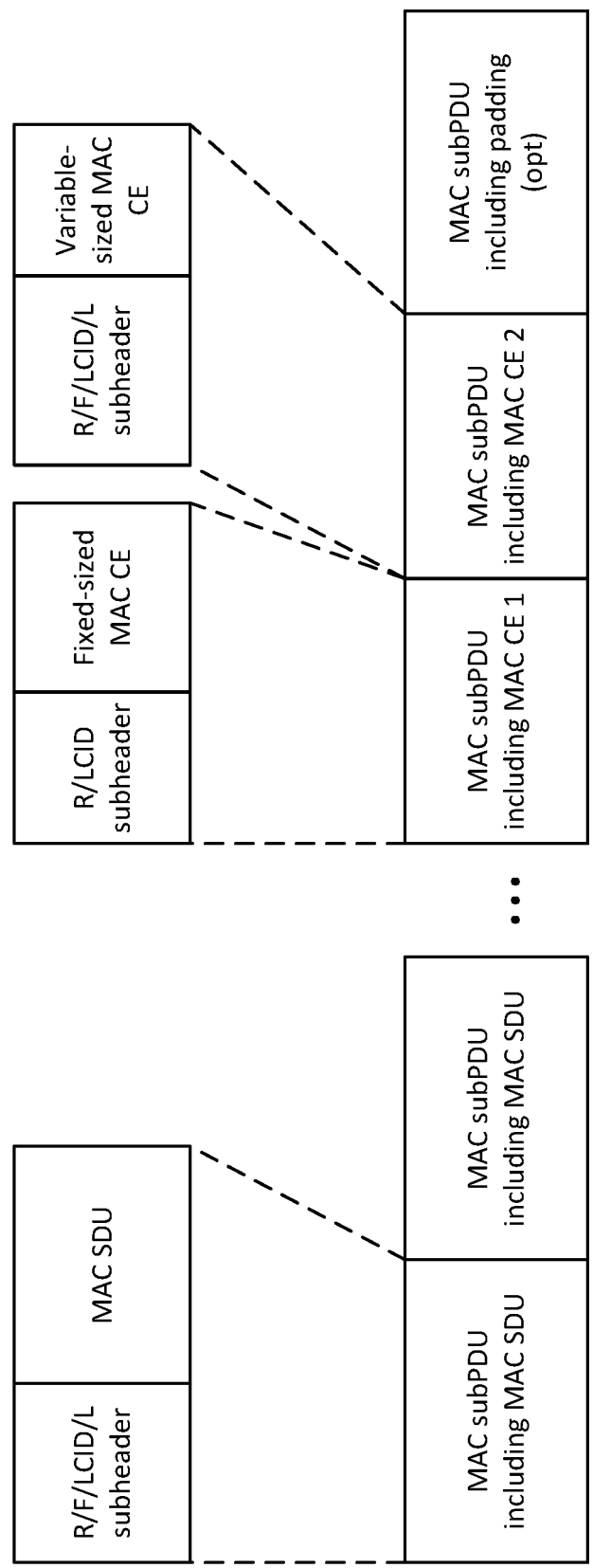
FIG. 7 illustrates an example of NR Uu MAC PDU Uplink.

For communication over the NR Uu downlink, a Medium Access Control (MAC) Protocol Data Unit (PDU) may have a format as shown in FIG. 6, while for communication over the NR Uu uplink the MAC PDU may have a format as shown in FIG. 7.

NR Uu includes the concept of a subPDU. A MAC PDU may consist of one or more MAC subPDUs. Each MAC subPDU may consist of one of the following: a MAC subheader only (including padding); a MAC subheader and a MAC SDU; a MAC subheader and a MAC CE; and a MAC subheader and padding.

The MAC SDUs may be of variable sizes. Each MAC subheader may corresponds to either a MAC SDU, a MAC CE, or padding. MAC CEs may be placed together. For the downlink, DL MAC subPDU(s) with MAC CE(s) is placed before any MAC subPDU with MAC SDU and MAC subPDU with padding. For the uplink, UL MAC subPDU(s) with MAC CE(s) is placed after all the MAC subPDU(s) with MAC SDU and before the MAC subPDU with padding. The size of padding can be zero. No sidelink MAC PDU has yet been defined in standards for NR Uu.

Example Challenges

Buffer Status Reporting Challenge

Currently for LTE sidelink communication and as discussed in herein, a MAC entity may transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

Similarly, in LTE all Sidelink BSRs transmitted in a TTI always reflect the buffer status after all MAC PDUs have been built for this TTI. Each LCG reports at the most one buffer status value per TTI, and this value is reported in all Sidelink BSRs reporting buffer status for the LCG. Also, for LTE V2X sidelink BSR reporting, if the number of bits in the UL grant is less than the size of a Sidelink BSR containing buffer status for all LCGs having data available for transmission plus its sub-header, the UE reports a Truncated Sidelink BSR containing buffer status for as many LCGs having data available for transmission as possible, taking the number of bits in the UL grant into consideration.

In NR, transmission opportunity timing is variable, grant duration is variable, and multiple grants may overlap. Further, there may be diverse use cases of NR. These use cases may have conflicting requirements, and techniques for BSR mapping to MAC PDU are needed to accommodate these varying requirements. Specifically, criteria for determining which LCH/LCG's buffer status should be transmitted when the MAC PDU containing BSR does not have enough room to accommodate the buffer status for all the LCGs having data available for transmission, need to be designed. Furthermore, in the case when the MAC entity is requested to transmit multiple MAC PDUs in a transmission opportunity, for example in carrier aggregation case, the issue of how to maximize the use for available grant for BSR transmission considering the fact that only one regular BSR or periodic BSR MAC CE, and one padding BSR can be transmitted in any given BSR transmission opportunity, need to be addressed.

Another issue that affects BSR reporting is the introduction of ProSe Per Packet Reliability (PPPR) that is currently being discussed in in 3GPP (for example, RAN2, SA2) in the context of LTE release 15 V2X. In the context of V2X NR, the issue of BSR reporting in support of PPPR requirements need to be addressed.

Another potential issue is the design of BSR for sidelink communication for example, in the case where, while in out of a coverage, a UE plays the role of a cluster head in managing communication resources within the cluster, for example, in the case of vehicle platooning. In such a scenario, there is a new for a procedure to allow the UE to request transmission resource grants from a serving Relay-UE.

Scheduling Request Challenge

There is no specific schedule request designed for LTE V2X sidelink. LTE V2X sidelink communication scheduling request relies on LTE Uu scheduling request mechanism. This is likely because LTE V2X was designed to support mainly one use case that is the basic vehicular safety communication. However, NR V2X is being designed to support diverse use cases, such as vehicle platooning, extended sensors, advanced driving, and remote driving. NR Uu scheduling request mechanisms may be used in support of NR V2X. The question then becomes for a service with a given QoS requirement (e.g., URLLC), whether there is a requirement to convey any handling differentiation to the network for scheduling request for sidelink data transmission versus uplink data transmission (e.g., data transmission over Uu interface), or whether any required differentiation can just be handled through BSR.

Another potential issue is the design of scheduling request for sidelink communication, for example, in the case where a UE outside of a coverage zone plays the role of a cluster head in managing communication resources within the cluster, such as in the case of vehicle platooning. In such a scenario, there is a need for a procedure to allow the UE to request transmission resource grants from a serving Relay-UE.

Solutions for BSR

Sidelink BSR

BSR reporting may be used in support of scheduling for transmission over sidelink.

Control of Sidelink BSR by RRC

RRC controls BSR reporting for the sidelink by configuring the timers periodic-BSR-TimerSL and retx-BSR-TimerSL. It is herein proposed that in addition to those two parameters, the parameter logicalChannelSR-MaskSL, is also configured into the UE by RRC for the control of BSR reporting. The parameter logicalChannelSR-MaskSL indicates whether SR masking is configured. The value of the parameter logicalChannelSR-MaskSL is used by the UE to decide whether or not to trigger a Scheduling Request (SR) when a BSR is triggered and not cancelled but cannot be transmitted for example, because there is no UL-SCH resource available for a new transmission, or if the UL-SCH resources available for a new transmission do not meet the LCP mapping restrictions. The parameter logicalChannelSR-MaskSL may be configured as a Boolean value where the value 1 indicates the SR masking is configured or setup for the sidelink logical channel. When SR masking is setup for the sidelink logical channel, a scheduling request may not be triggered for a BSR triggered by data availability on this logical channel.

An example procedure could be described as follows:

The MAC entity shall:

1> if the Sidelink Buffer Status reporting procedure determines that at least one sidelink BSR has been triggered and not cancelled:

2> if UL-SCH resources are available for a new transmission:

3> instruct the Multiplexing and Assembly procedure to generate the sidelink BSR MAC CE(s);

3> start or restart periodicBSR-TimerSL except when all the generated sidelink BSRs are Truncated Sidelink BSRs;

3> start or restart retxBSR-TimerSL

2> if there is no UL-SCH resource available for a new transmission; or

2> if the UL-SCH resources available for a new transmission do not meet the LCP mapping restrictions configured for the logical channel(s) that triggered the Sidelink BSR(s):

3> if a Regular Sidelink BSR has been triggered:

4> if the MAC entity is not configured with configured uplink grant(s); or

4> if the Regular Sidelink BSR was not triggered for a sidelink logical channel for which logical channel SR masking (logicalChannelSR-MaskSL) is setup by upper layers:

5> trigger a Scheduling Request.

Additional Sidelink Regular BSR triggering Conditions

In the current LTE V2X, the sidelink regular BSR reporting condition does not take into account LCP restrictions. For example, considering a case where sidelink data might become available for transmission and that data belongs to a sidelink logical channel with same or lower priority than the priorities of the sidelink logical channels which belong to any LCG belonging to the same ProSe Destination and for which data is already available for transmission. In such a case, regular sidelink BSR will not be triggered. However, if LCP restrictions for this logical channel is such that sidelink grant assigned to the UE or that would be assigned to the UE, based on logical channels for which data is already available for transmission, cannot serve this logical channel for which SL data becomes available for transmission, then a regular sidelink BSR shall be triggered.

The following text proposal is an example of updated text for the existing specification in 3GPP TS 36.331, Radio Resource Control (RRC); Protocol specification (Release 15), V15.1.0, where the updated text is underlined:

"A sidelink Buffer Status Report (BSR) shall be triggered if any of the following events occur:

if the MAC entity has a configured SL-RNTI or a configured SL-V-RNTI:

SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, or SL data, for a sidelink logical channel of a ProSe Destination, becomes available for transmission in the RLC entity or in the PDCP entiy and the data belongs to a sidelink logical channel with same or lower priority than the priorities of the sidelink logical channels which belong to any LCG belonging to the same ProSe Destination and for which data is already available for transmission but the sidelink resource grants for data already available for transmission would not satisfy LCP restrictions for the newly available data, in which case the Sidelink BSR is referred below to as "Regular Sidelink BSR";

It is also herein proposed that there is a new trigger for regular sidelink BSR that takes into account the reliability requirement of the data that becomes available for transmission. For example, considering a case where sidelink data might become available for transmission and that data belongs to a sidelink logical channel with the same or lower priority than the priorities of the sidelink logical channels which belong to any LCG belonging to the same ProSe Destination and for which data is already available for transmission. In such a case as per the current specification, regular sidelink BSR will not be triggered. However, if the reliability requirement for the logical channel for which new data became available is such that the sidelink grant assigned to the UE or that would be assigned to the UE, based on logical channels for which data is already available for transmission, cannot serve this logical channel then a regular sidelink BSR shall be triggered. For example, if the reliability requirement of the newly available data requires packet duplication, while the already available data requires no data duplication, then a new regular sidelink BSR should be triggered.

A new sidelink BSR MAC Control Element (MAC CE) that also includes the buffer size for the data that needs to be duplicated is herein proposed below. The herein proposed formats are defined using 0, 2, 4, and 6 reserved bits as shown in FIG. 8, FIG. 9, FIG. 10, and FIG. 11, respectively.

An alternative format where the duplicated buffer field size is optionally included in the sidelink BSR, e.g., if it is non-zero is for a given LCG, is also herein proposed. The herein proposed format includes the field $D_i$ to indicate whether or not the Duplication Buffer Size field is present for a given LCG i. FIG. 12 shows an illustration of the herein proposed MAC CE format where the number of LCGs is 4, and the duplicated buffer size field is reported for LCG $ID_1$ and LCG $ID_3$.

Figure 13:
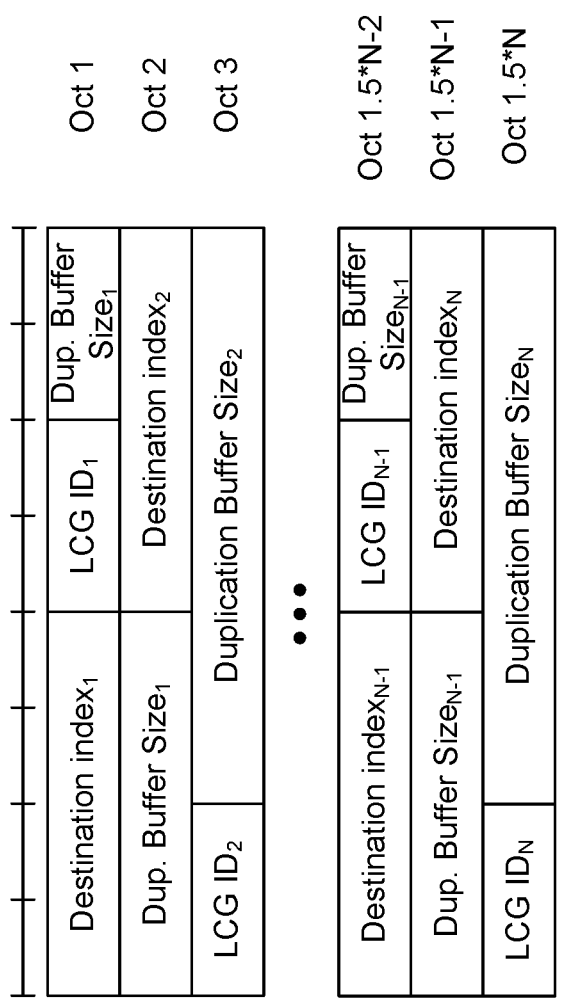
FIG. 13 illustrates an example sidelink duplication BSR and truncated sidelink duplication BSR MAC CE for Even N.

And in another alternative, the duplicated buffer size may be reported in a separate MAC CE that is included in the same MAC PDU as the sidelink BSR. FIG. 13 and FIG. 14 are illustrations of the herein proposed format for even and odd values of N respectively.

The Sidelink Duplicated BSR may be identified by a MAC PDU subheader with a unique LCID, such as the one shown in the example in Table 2.

TABLE 2

Values of LCID for UL-SCH

| Index | LCID values |
| --- | --- |
| 000000 | CCCH |
| 000001-100000 | Identity of the logical channel |
| 100001-110011 | Reserved |
| 110100 | Sidelink Duplication BSR |
| 110101 | Truncated Sidelink BSR |
| 110110 | Sidelink BSR |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

Figure 15:
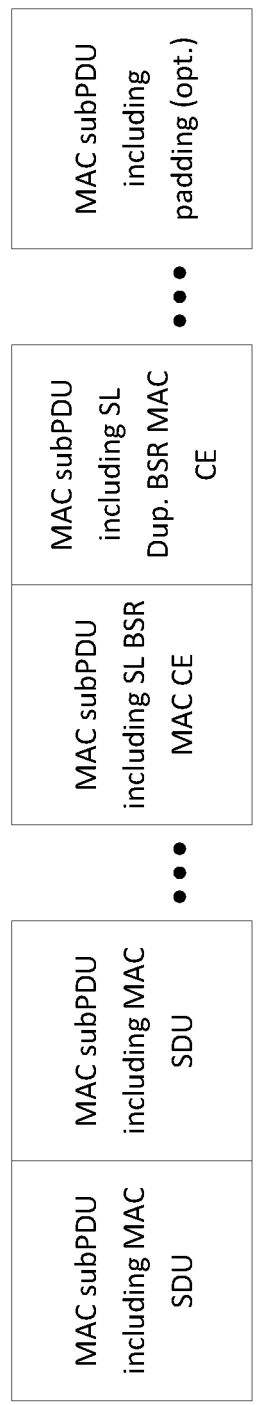
FIG. 15 illustrates an example UL MAC PDU with SL BSR MAC and SL duplication BSR MAC CE.

An illustration of a MAC PDU containing a Sidelink BSR MAC CE and a Sidelink Duplicated BSR MAC CE is shown in FIG. 15. Upon reception, the gNB differentiates the Sidelink BSR MAC CE from the Sidelink Duplicated BSR MAC CE based on the LCID included in each of the respective MAC CE subheaders.

Rules for Sidelink BSR reporting in Case of Insufficient Available UL Grant

For Regular and Periodic Sidelink BSR, if the number of bits in the UL grant is less than the size of a Sidelink BSR containing buffer status for all LCGs having data available for transmission plus its sub-header, the MAC shall report BSR following one or more of the following rules:

1. The MAC shall prioritize BSR reporting of the LCG(s) having the LCH(s) with the most stringent latency requirement.
   a. For the prioritized LCGs, the MAC reports the full sidelink BSR for each LCG and if the number of bits in the UL grant is less than the size of a Sidelink BSR containing buffer status for all prioritized LCGs having data available for transmission plus its sub-header, the MAC reports Truncated Sidelink BSR containing buffer status for as many LCGs having data available for transmission as possible, taking the number of bits in the UL grant into consideration.
   b. If any UL grant remains after having included in the sidelink BSR, the buffer status of the prioritized LCGs as per the rule the above, the MAC shall include into the BSR, truncated buffer status for as many remaining LCGs as possible, taking the number of bits in the UL grant into consideration.
2. Report Truncated sidelink BSR of the LCG(s) with the sidelink logical channels having data available for transmission following a decreasing order of priority, and in case of equal priority, in increasing order of LCGID.
3. A combination of rule 1 and rule 2 above. For example, the MA prioritized first, buffer status for LCGs with most stringent latency requirement, and then if any UL grant remains, the rule 2 above is used. For example, the MAC entity applies first the rul1 1-a) above and if any UL grant remains, the rule 2 above is applied.

The most stringent requirement may be defined as one or more of the following:

A configured latency threshold, or a boolean value associated with each LCH, and which defined the LCH being subject to stringent latency or not subject to stringent latency. Value 1 may mean the LCH is subject to a stringent latency requirement, while value 0 may mean the 1CH is not subject to stringent latency requirement;

maxPUSCH-Duration which sets the maximum PUSCH duration allowed for transmission;

Parameter K2 which define the duration between reception og UL grant to the beginning of transmission time usinf the UL grant.

maxPUSCH-Duration+K2

Per the current MAC specification, the MAC entity transmits at most one Regular/Periodic Sidelink BSR in a TTI. If the MAC entity is requested to transmit multiple MAC PDUs in a transmission opportunity (e.g., TTI), it may include a padding Sidelink BSR in any of the MAC PDUs which do not contain a Regular/Periodic Sidelink BSR. It is herein proposed that for the padding BSR, the MAC also applies the BSR prioritization rules defined herein. For example, when the MAC is request to transmit multiple MAC PDUs in a transmission opportunity, the MAC prioritize the inclusion of LCGs buffer status into the padding BSR(s), following the prioritization rules defined above.

Uplink Transmission BSR

BSR reporting may be used in support of scheduling for transmission over Uu interface.

As described, e.g., in reference to FIG. 3 and FIG. 4, under current standards an SR is not triggered if an upcoming grant for UL-SCH is available and meets the LCP mapping restriction configured for the logical channels that triggered the BSR(s), e.g., the upcoming grant can be used to transmit the data of the logical channels that triggered the BSR(s) and therefore the corresponding BSR(s). With the introduction of V2X sidelink transmission in NR and the possible prioritization of sidelink transmission over uplink transmission, an SR may still be transmitted if the UL-SCH resources available for a new transmission meet the LCP mapping restrictions configured for the LCH(s) that triggered the BSR(s), but a new transmission using the available UL-SCH resources would be pre-empted by sidelink transmission. In such case, the BSR is not transmitted and the BSR related timers are not started or restarted. The MAC specification of the current standard in relation to delaying the transmission of a SR might be updated as follows, for example:

"The MAC entity shall:
1> if the Buffer Status reporting procedure determines that at least one BSR has been triggered and not cancelled:
  2> if UL-SCH resources are available for a new immediate transmission, and sidelink transmission is not prioritized over a new transmission:
    3> instruct the Multiplexing and Assembly procedure to generate the BSR MAC CE(s);
    3> start or restart periodicBSR-Timer except when all the generated BSRs are long or short Truncated BSRs;
    3> start or restart retxBSR-Timer.
  2> if there is no UL-SCH resource available for a new transmission; or
  2> if the UL-SCH resources available for a new transmission do not meet the LCP mapping restrictions (see subclause 5.4.3.1 of TS 38.321) configured for the LCH(s) that triggered the BSR(s); or
  2> if a sidelink transmission is prioritized over a new transmission using the available UL-SCH resources:
    3> if a Regular BSR has been triggered and logicalChannelSR-DelayTimer is not running:
      4> if an uplink grant is not a configured grant; or
      4> if the Regular BSR was not triggered for a logical channel for which logical channel SR masking (logicalChannelSR-Mask) is setup by upper layers:
        5> trigger a Scheduling Request."

Alternatively:
The MAC entity shall:
1> if the Buffer Status reporting procedure determines that at least one BSR has been triggered and not cancelled:
  2> if UL-SCH resources are available for a new transmission and the UL-SCH resources can accommodate the BSR MAC CE plus its subheader as a result of logical channel prioritization, and sidelink transmission is not prioritized over a new transmission:
    3> instruct the Multiplexing and Assembly procedure to generate the BSR MAC CE(s);
    3> start or restart periodicBSR-Timer except when all the generated BSRs are long or short Truncated BSRs;
    3> start or restart retxBSR-Timer.
  2> if a Regular BSR has been triggered and logicalChannelSR-DelayTimer is not running:
    3> if there is no UL-SCH resource available for a new transmission; or
    3> if the MAC entity is configured with configured uplink grant(s) and the Regular BSR was triggered for a logical channel for which logicalChannelSR-Mask is set to false; or
    3> if the UL-SCH resources available for a new transmission do not meet the LCP mapping restrictions (see subclause 5.4.3.1) configured for the logical channel that triggered the BSR; or
    3> if a sidelink transmission is prioritized over a new transmission using the available UL-SCH resources:
      4> trigger a Scheduling Request.

Enhancements for SR Transmission over LTE Uu or NR Uu

The Scheduling Request may be tied to an SR configuration. This configuration may have one or more of the following:
- Details about the physical resources for SR transmission.
- Applicability to Uu or SL transmission
- Details about the type of the sidelink communication that may use this SR configuration. Where type may be based on the expected priority or reliability of the sidelink traffic. For example an SR configuration may be tied to a priority level of the sidelink communication, as determined by the PPPP, or the reliability of the downlink communication, as determined by the PPPR When a UE needs to send an SR to the eNB (or gNB), it selects a suitable SR configuration based on: desired transmission (Uu or SL), desired priority, desired reliability, etc.

BSR and SR Solutions for Scheduling over Sidelink—Controlled by a Scheduler-UE (UE_S)

In the following we will use the term Relay-UE and Scheduler-UE interchangeably. This is any UE that is in charge of scheduling sidelink transmissions for other UEs. For example, it may be a cluster head or a platoon leader. Furthermore, the scheduler-UE may be an Integrated Backhaul Access (IAB) node with sidelink connection to the UE, a Road Side Unit (RSU) with sidelink connection to the UE or any other scheduling entity with sidelink connection to the UE. In such cases, the resource allocation for the sidelink is similar to Mode 2(d) defined in 3GPP TR 38.885, NR; Study on Vehicle-to-Everything, V1.0.0. Note that we will also use the term Non-Scheduler UE (or simply UE) to denote any UE that uses sidelink resources that are assigned by the Scheduler UE.

Herein, the term BSR may refer to a sidelink BSR or a truncated sidelink BSR, for example.

Figure 16:
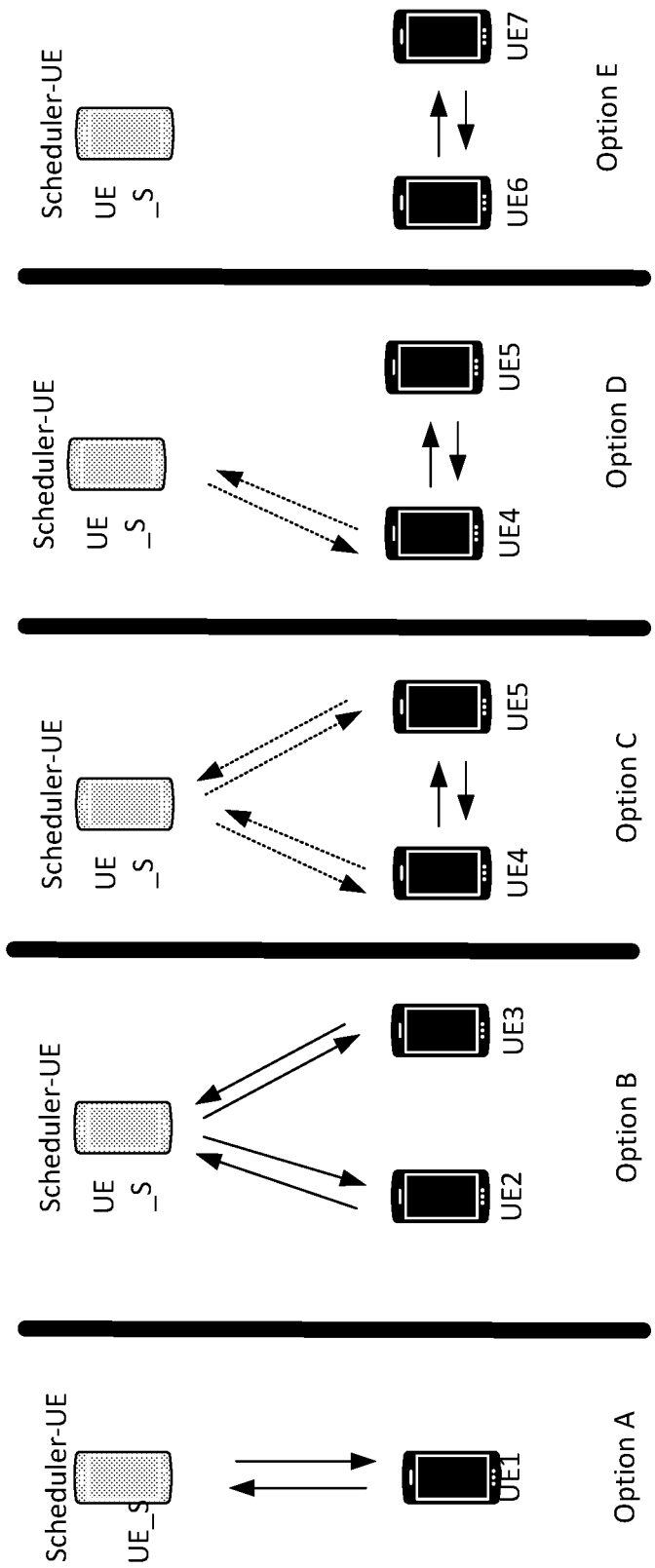
FIG. 16 illustrates example sidelink communication scenarios of using a Scheduler-UE.

A number of potential Sidelink communication scenarios with a Scheduler-UE, are shown in FIG. 16. FIG. 16 shows the user plane communication between the UEs. No control plane signaling is shown.

Option A: A UE (UE1) is communicating with the Scheduler-UE (UE_S). The communication is scheduled by UE_S.

Option B: Two UEs (UE2 and UE3) communicate over the sidelink resources, but all communication is through the Scheduler UE (UE_S). The Scheduler UE acts like a relay between the two UEs, and plays a role very similar to a WiFi Access Point. UE_S schedules transmission to and from both UEs.

Option C: Two UEs (UE4 and UE5) communicate directly over a form of user-plane connection (which we will refer to as a sidelink data radio bearer) using sidelink resources that are assigned by the UE_S. In addition, the two UEs also have sidelink data radio bearers to the UE_S. For example, the UE_S may be the leader in a platoon of cars. The platoon leader communicates regularly with the members of the platoon, and these individual members may also communicate directly amongst themselves.

Option D: Similar to Option C, but with only one of the two UEs (UE4 is shown in FIG. 16) having a sidelink data radio bearer to the UE_S.

Option E: Two UEs (UE6 and UE7) communicate directly over a sidelink data radio bearer using sidelink resources that are assigned by the UE_S. In addition, the two UEs have no sidelink data radio bearers to the UE_S. As a result, these UEs are not "regularly" communicating with the UE_S. That is, there is no user plane connection between these UEs and UE_S. However, there may be control plane signaling between these UEs and UE_S. This signaling used to schedule the sidelink communication between UE6 and UE7.

In each of the communication options shown in FIG. 16, it is assumed that the Scheduler-UE is responsible for scheduling/allocating physical channel resources on the sidelink. The set of resources that are to be managed by the Scheduler-UE may be statically configured by a gNB, or pre-configured in the UEs. A deployment may have multiple Scheduler-UEs. The resources used by each of these Scheduler-UEs may be dedicated (not shared between Scheduler-UEs). Alternatively, a Scheduler-UE may be assigned, for example by a gNB, a resource pool for scheduling UEs under control of the Scheduler-UE. The resource pool may be shared with another Scheduler-UE. Both Scheduler-UEs contend for resource reservation from this common resource pool, for example using sending/Listen-Before-Talk (LBT) techniques. Once the Scheduler-UE has reserved the resources, the Scheduler-UE may use the reserved resource to assign resources to the UEs that it is scheduling. In another alternative, once the Scheduler-UE has dedicated or reserved resources, it may semi-statically schedule UEs on these resources. However, the scheduled resources may not be mutually exclusive. The UEs may rely on sensing on the semi-statically assigned resources to reserve these.

The overall SL transmission procedure for a scenario with a Scheduler-UE is described below:
1. The Scheduler-UE is assigned a set of resources to manage for sidelink operation
2. The Non-Scheduler UEs "associate" with the group managed by the Scheduler-UE
3. If Buffer Status Report (BSR) triggering criteria is met, a BSR is triggered at the UE. This may be as a result:
   of an application on UE1, a Non-scheduler UE, generating data that it needs to send to another UE (referred to as a Regular BSR), or
   as a result of the expiry of a periodic BSR timer (referred to as a Regular BSR)
4. If resource grants, for example dynamically scheduled resource grants, configured sidelink resource grants or UE's autonomously assigned sidelink resource grants are available, UE1 will follow the BSR procedure and transmit a BSR to the Scheduler-UE
5. If resource grants, for example dynamically scheduled resource grants, configured sidelink resource grants or UE's autonomously assigned sidelink resource grants are not available, a Scheduling Request (SR) will be triggered.
6. The Scheduler-UE assigns resources to UE1
7. UE1 transmits its transport block on the assigned resources How a UE sends a BSR to a Scheduler-UE is more complicated than in LTE sidelink operation (or NR SL Transmission Mode 1), since the scheduling is done without an eNB (or gNB). A second problem is that the BSR mechanism defined for the LTE Uu and NR Uu leverages the fact that UEs typically have data radio bearers that pass through the entity performing the scheduling (the eNB or gNB). As a result, UEs have opportunities to piggyback the BSR information on these radio bearers. In contrast, some cases using a Scheduler-UE (namely Option D and Option E), have UEs that do not have data radio bearers to the Scheduler-UE. These UEs need a dedicated mechanism to send the Scheduling Request and subsequently the BSR information. A third problem is that the SR mechanism defined for the LTE Uu and NR Uu leverages the fact that UEs have a control plane mechanism to send the SR to the entity performing the scheduling (the eNB or gNB). As a result, UEs have opportunities to send the SR carried on Uplink Control Information (UCI) over the Physical Uplink Control Channel (PUCCH) or Physical Uplink Shared Channel (PUSCH). These SR opportunities/resources are configured by the eNB (or gNB). In contrast, cases using a Scheduler-UE (Option A through Option E), involves SR or BSR over sidelink from UEs that have no defined/standardized methods to report such information toward the UE_S.

BSR Reporting Over Sidelink Interface

It is herein proposed to introduce a new sidelink BSR procedure for sidelink BSR reporting over the sidelink interface, in support of scheduling of UEs served by Scheduler-UE or a relay-UE. The BSR may be in support of transmission between the reporting UE and the serving Scheduler-UE (or relay-UE), or the BSR may be in support of transmission between the reporting UE and another UE. This new sidelink BSR MAC Control Element (MAC CE) is transmitted by the UE reporting the BSR to the Scheduler-UE or serving relay-UE.

Sidelink MAC PDU

Figure 17:
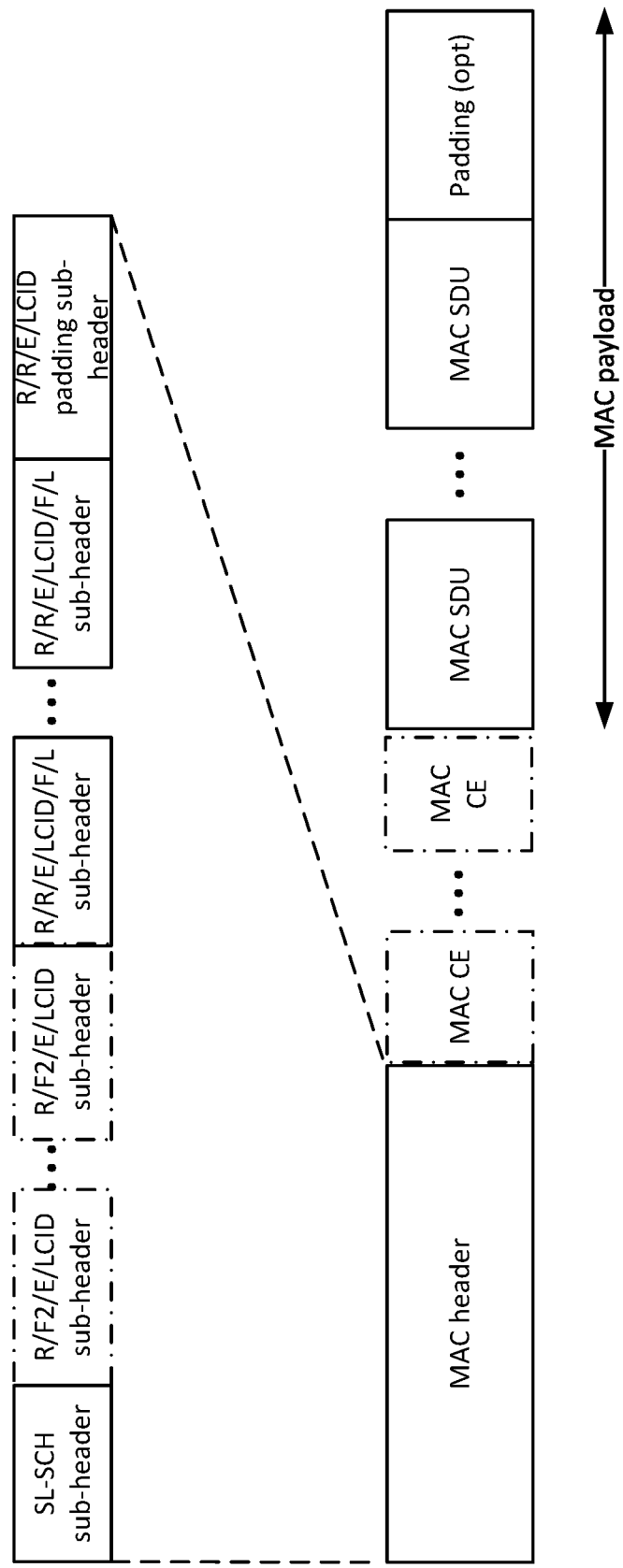
FIG. 17 illustrates an example modified MAC PDU for SL-SCH (Format 1).
Figure 18:
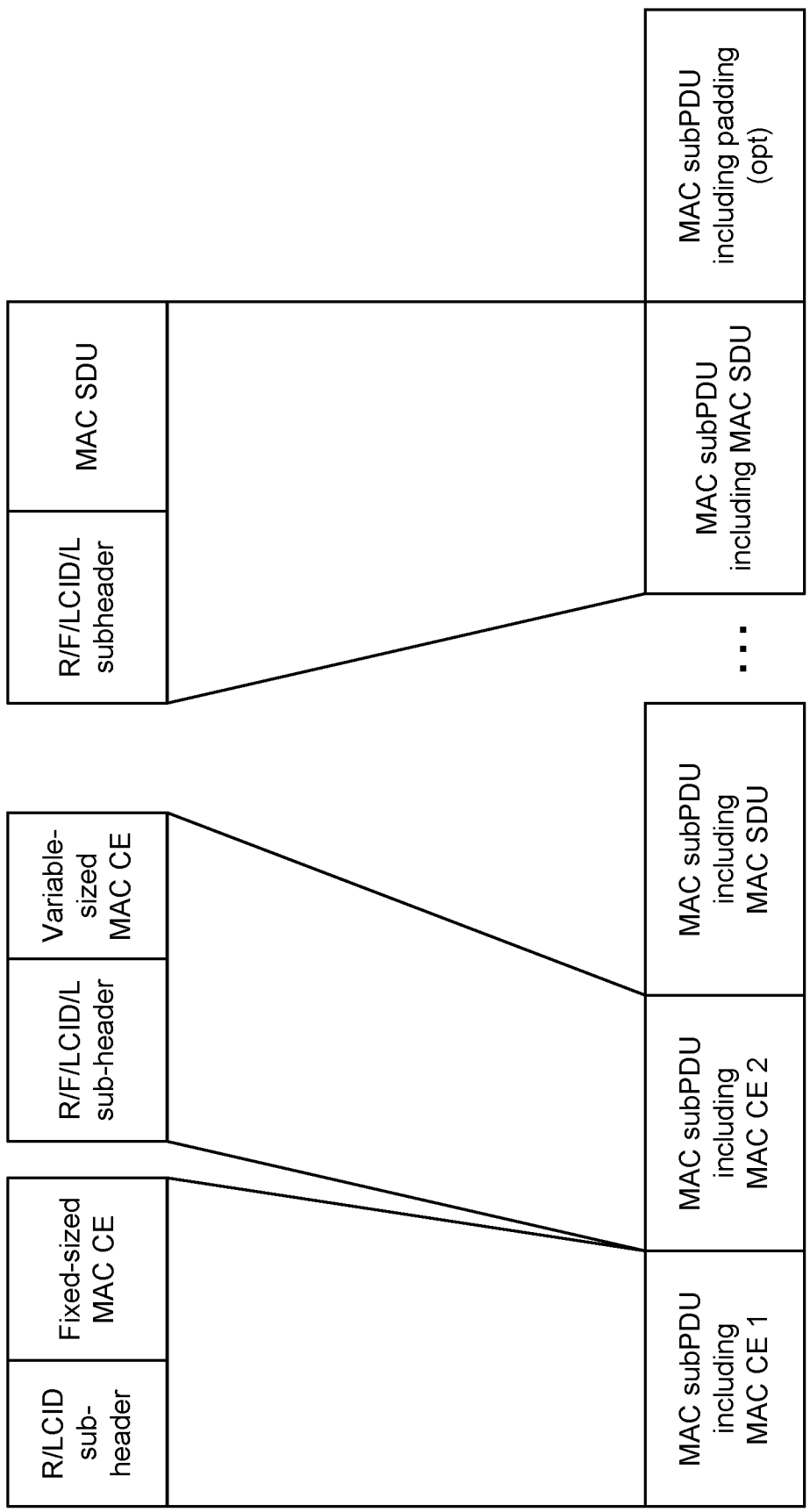
FIG. 18 illustrates another example modified MAC PDU for SL-SCH (Format 2).

The MAC PDU for the SL-SCH may have one or more MAC control elements in addition to one or more MAC SDUs, and padding. Each of these will have an associated MAC subheader, which identifies type, logical channel, size, etc. An example MAC PDU format is shown in FIG. 17, for the case where all the MAC subheaders are grouped together and contained in one block (in one MAC Header) at the beginning of the MAC PDU. Another example MAC PDU format is shown in FIG. 18, for the case where each MAC subheader immediately precedes the MAC control element or MAC SDU or padding that it is associated with. Note that FIG. 18 shows the MAC control elements preceding the MAC SDUs. However this placement is optional. For example, the MAC control elements may be placed after the MAC SDUs, or interspersed between MAC SDUs. The latter option may be based in the priority of the MAC control element and/or MAC SDU.

Each MAC Control Element has an associated sub-header in the MAC PDU header or in the MAC subPDU header. Each of these sub-headers may have one or more of the following fields:
  Source: The source field identifies the source for sidelink communication.
  Destination: The Destination field identifies the destination for sidelink communication.
  Source-Destination Index: An index to the Source-Destination pair F2: The Format2 field indicates the size of the Length field. There is one F2 field per MAC PDU subheader. The size of the F2 field is 1 bit. If the size of the MAC SDU or variable-sized MAC control element is larger than 32767 bytes, and if the corresponding subheader is not the last subheader, the value of the F2 field is set to 1, otherwise it is set to 0.

E: The Extension field is a flag indicating if more fields are present in the MAC header or not. The E field is set to "1" to indicate another set of at least R/F2/E/LCID fields. The E field is set to "0" to indicate that either a MAC SDU, a MAC control element or padding starts at the next byte;

R: Reserved bit, set to "0";

LCID: Logical Channel ID to denote the type of MAC Control Element

Each MAC Control element may have BSR fields and also report the Duplicate Buffer size. In addition, the MAC control element may include one or more of the following fields:

Source: The source field identifies the source for sidelink communication.

Destination: The Destination field identifies the destination for sidelink communication.

Source-Destination Index: An index to the Source-Destination pair

LCG_i: Indicates if the buffer status for logical channel group "i" is included in the BSR MAC control element LCG ID: The Logical Channel Group ID field identifies the group of logical channel(s) which buffer status is being reported;

LCID: Logical Channel ID identifies the logical channel which buffer status is being reported;

Buffer Size: The Buffer Size field identifies the total amount of data available across all logical channels of a LCG for the destination identified by the Destination Index;

Duplicate Buffer Size: The Duplicate Buffer Size field denotes the buffer size for the data that needs to be duplicated R: Reserved bit, set to "0".

In one option the Source field of the MAC Control element includes the Source Layer 2 ID and Destination field of the MAC Control element includes the Destination Layer 2 ID for unicast or UEs for groupcast.

In a second option, the Source field of the subheader associated with the MAC Control element includes the Source Layer 2 ID and Destination field of the subheader associated with the MAC Control element includes the Destination Layer 2 ID.

In a third option, the Scheduler-UE maintains a list of Layer 2 IDs and only the index to this list is included in the MAC control element or subheader associated to the MAC control element.

In a fourth option, the Scheduler-UE maintains a list of all source Layer 2 ID-destination Layer 2 ID pairs for which it is scheduling resources and only the index to the pair is included in the MAC control element or subheader associated with the MAC control element.

For the options 3 and 4, relying on lists, the UEs and the Scheduler UE need to establish and maintain these lists using signalling on control plane or data plane. For example, these lists can be established/maintained during a form of association procedure, connection establishment procedure, or connection reconfiguration procedure. During connection establishment, a UE may provide a list of addresses for which it would like to establish sidelink communication.

The Scheduler-UE uses these addresses to create a list, and confirms this list to the UEs. These lists are modified as a UE terminates SL communications with some UEs and initiates SL communication with other UEs.

Note that is some cases, the Source Layer 2 ID may be included in a common MAC PDU sub-header (like the SL-SCH sub-header shown in FIG. 17). In such a case, the BSR MAC CE (or the sub-header associated with the BSR MAC CE) may include only the Destination Layer 2 IDs or indexes.

Procedure for Sidelink Communication Options A, B, and C

The BSR rules for Scenario A, B, and C are similar to those described, e.g., in relation to FIGS. 8-15.

Procedure for Sidelink Communication Option D

Figure 19:
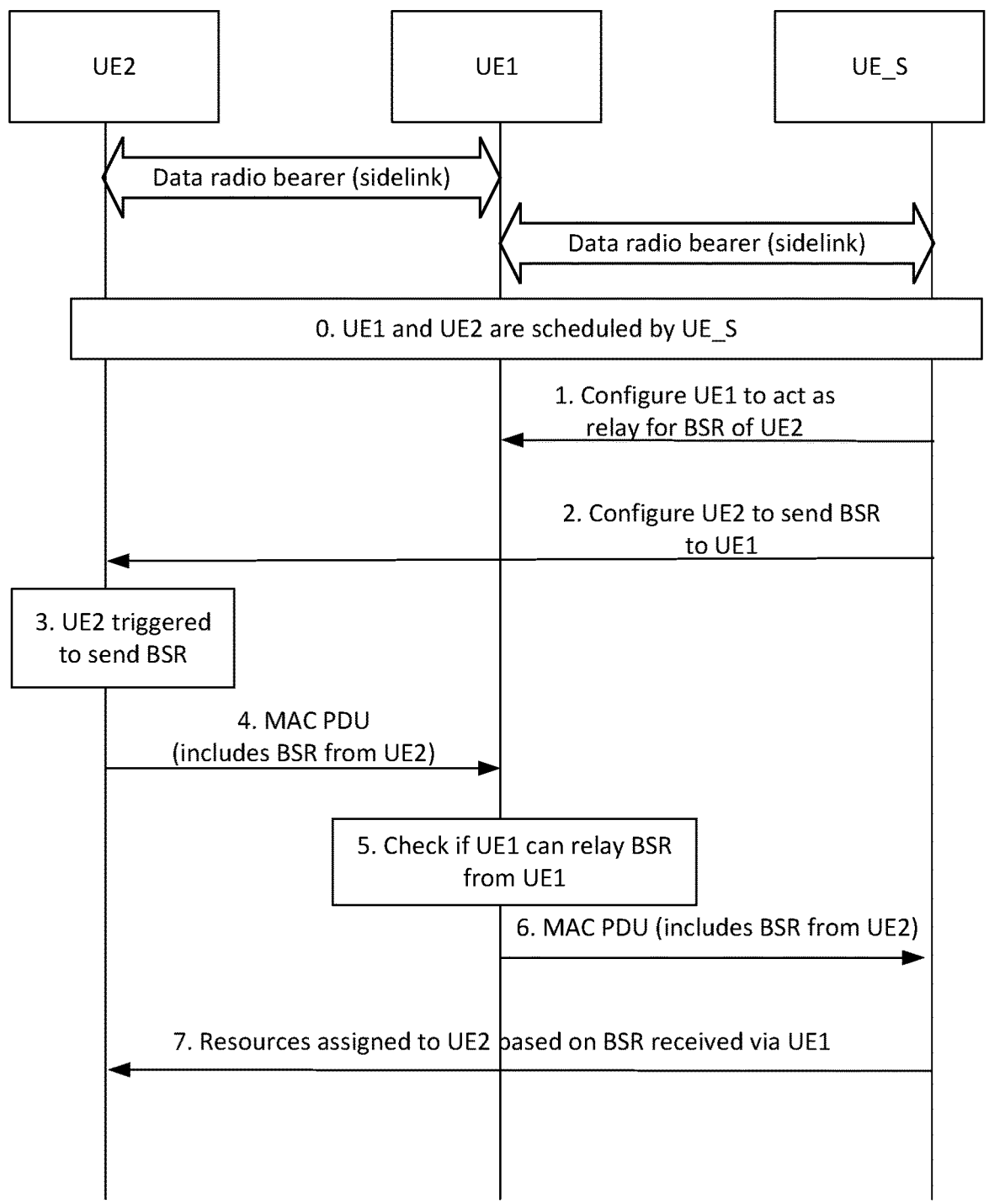
FIG. 19 is a call flow diagram of an example of relaying BSR (Option D).

In this option only one peer UE has a sidelink data radio bearer with the Scheduler-UE. The assumption is that there is sidelink control plane connection from UE1 to UE_S and from UE2 to UE_S. There is also a Sidelink data radio bearer between UE1 and UE_S, but no sidelink data radio bearer between UE2 and UE_S. As a result, UE1 may act as a relay to send the BSR of UE2 to the Scheduler-UE. UE2 uses the sidelink data radio bearer between UE1 and UE_S to send its BSR to the UE_S. An example call flow is shown in FIG. 19 and described below:

In step 0, UE1 and UE2 have both "association" a Scheduler-UE (UE_S). They intend to communicate over a sidelink interface. UE_S provides the scheduling for this communication. Here we use the term "association" quite generally. It implies that the UEs rely on the UE_S for scheduling their transmissions In step 1, UE_S is aware that it has a sidelink data radio bearer with UE1 and no sidelink data radio bearer with UE2. UE_S configures UE1 to act as a relay for BSR from UE2. For example, this may be provided through RRC signalling. UE_S may provide a white list of Source Layer 2 IDs for which UE1 can act as a BSR relay.

In step 2, UE_S configures UE2 to send its BSR information to UE1. For example, this may be provided through RRC signalling. UE_S may provide the Layer 2 ID for the relay BSR (DestinationBSR Layer 2 ID).

In step 3, UE2 is triggered to send a BSR.

In step 4, at the next data transmission on the sidelink interface to UE1, UE2 sends the BSR in a MAC control element to UE1. The subheader may indicate that the MAC control element is to be relayed to the UE_S. For example, this MAC control element may use a reserved Logical Channel ID, which would be recognized by UE1.

In step 5, UE1 receives the relay BSR. UE1 may check that it has been configured to relay BSR from this UE. If no, it can discard the MAC control element. If yes, UE1 stores the relay BSR.

In step 6, at next opportunity to send the BSR, UE1 sends the relay BSR to the Scheduler-UE (UE_S).

In step 7, UE_S assigns resources to UE2.

Note that in the case that UE1 is triggered to send a BSR and it has no message to send to UE1, then UE2 may be required to send a scheduling request to the Schedule-UE. It may use the procedure for transmitting SR as described for solutions for SR.

Note that in a case where multiple UEs can relay the BSR of UE2, the Scheduler-UE may select one of these multiple UEs. For example, this decision may be based on the load of these UEs, channel conditions to these UEs, channel conditions between UE2 and these UEs, distance to these UEs, distance between UE2 and these UEs, communication activity from the Scheduler-UE to/from these UEs, etc. For example, the Scheduler-UE may decide to choose the UE to which it is communicating the most with to maximize the probability that the BSR will be sent as quickly as possible.

Although Option D is shown as a unicast communication, the use of a UE to relay the BSR of another UE may also apply to a groupcast communication. In such a case, the Scheduler-UE may select which one (or more) UEs will be responsible for relaying the BSR, and may also select which UEs use which of these relay UEs.

Procedure for Sidelink Communication Option E

In this option neither of the 2 peer UEs have a sidelink data radio bearer to the Scheduler-UE. Before either of the peer UEs can transmit their BSR to the Scheduler-UE they need to first request a sidelink communication channel to UE_S. Once obtained, they can be assigned resources to communicate with the UE_S, and subsequently send their BSR.

Figure 20:
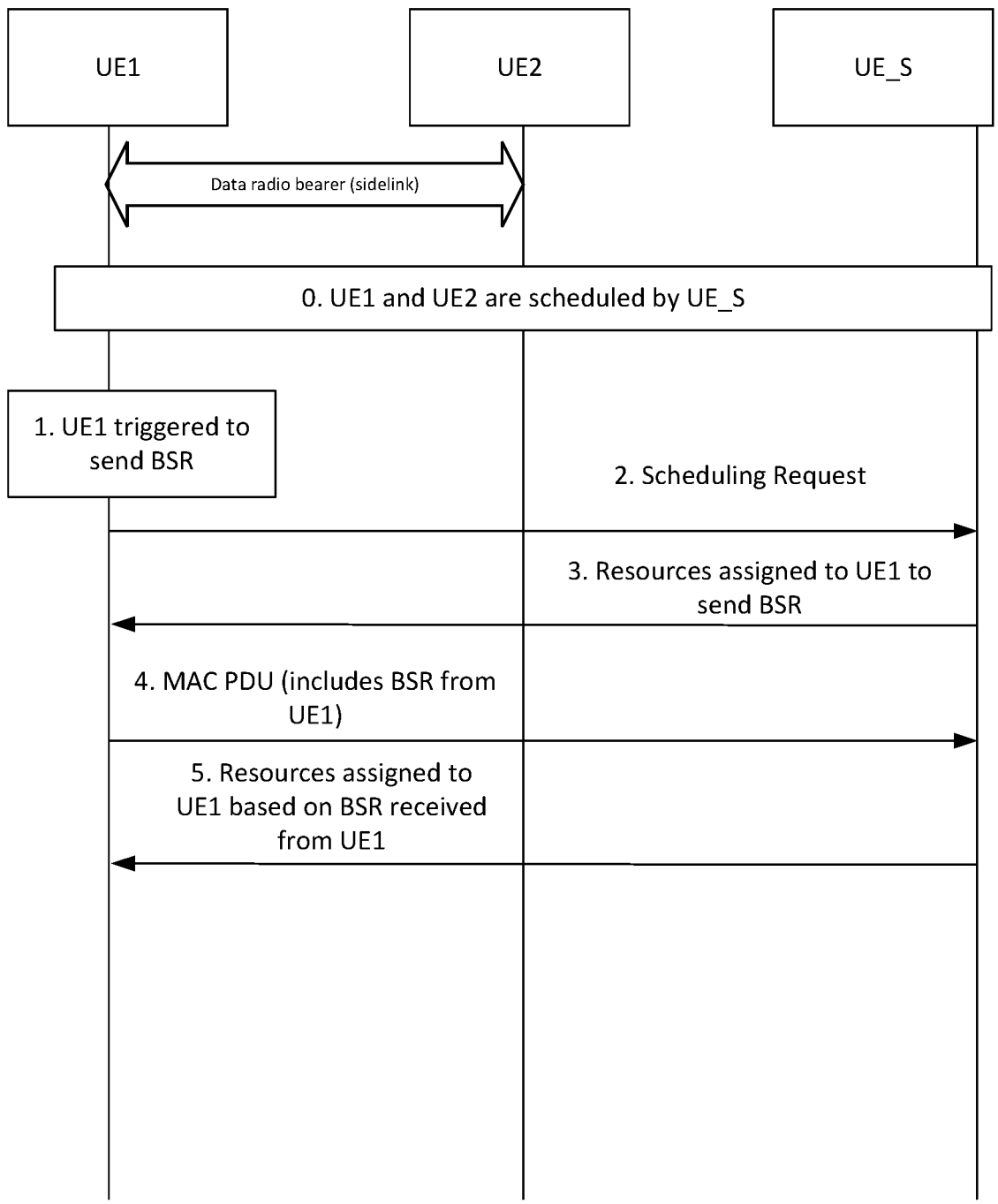
FIG. 20 is a call flow diagram of an example of a BSR sent after a scheduling request (Option E).

An example procedure is shown in the call flow of FIG. 20.

In step 0 of FIG. 20, the peer UEs have associated with Scheduler-UE. Here we use the term "associate" quite generally. It implies that the UEs rely on the UE_S for scheduling their transmissions.

In step 1, UE1 wants to transmit data to UE2 over the sidelink interface. UE1 is triggered to send a BSR. This BSR needs to be sent to UE_S.

In Step 2, UE1 sends a Scheduling Request to UE_S.

In Step 3, the UE_S assigns resources to UE1 for sidelink transmission from UE1 to UE_S.

In Step 4, the UE1 sends the BSR on the assigned resource.

In Step 5, the UE_S assigns resources for sidelink communication from UE1 to UE2.

Solutions for SR

It is herein proposed to introduce a new Scheduling Request procedure over the sidelink interface, for a UE served by a relay-UE (or Scheduler-UE) to request transmission resource grants from a serving Relay-UE (or serving Scheduler-UE.) The transmission may be between the requesting UE and the serving relay-UE or the transmission may be between the requesting UE and another UE. More than one Sidelink Scheduling Request configuration may be configured into the UE. The configuration for example, resource configuration of sidelink Scheduling Request may be specific to sidelink logical or a group of sidelink logical channels.

Rules similar to the ones described herein for sidelink BSR may also be applied for sidelink SR.

In the following it will be assumed that the Scheduling Request will be sent using the Physical Sidelink Control Channel (PSCCH) or Physical Sidelink Feedback Control Channel (PSFCCH). Three options are described below. In a first option, the UEs are configured with a periodic SR opportunity by the Scheduler-UE. In a second option, UEs are configured with a pool of resources available for transmitting the SR, and the UE randomly selects from this pool. In the third option, the Scheduler UE polls the individual UEs to determine if they have a pending Scheduling Request.

In addition it will be assumed that the Scheduling Request will be tied to an SR configuration. The SR configuration may include details about the physical resources for SR transmission. For example the PSCCH or PSFCCH used. The SR configuration may additionally or alternatively include details about the type of the sidelink communication that may use this SR configuration. The type may be based on the expected priority or reliability of the sidelink traffic. For example an SR configuration may be tied to a priority level of the sidelink communication, as determined by the PPPP, or the reliability of the downlink communication, as determined by the PPPR Option 1: Configuration of Periodic Dedicated SR Opportunities/Resources The Scheduler-UE may configure the UE with one or more of SR Period (the time between SR opportunities) and SR Resource (a specific resource assigned to UE for transmission of the Scheduling Request.

If a UE needs to send an SR to the UE_S, it waits for the next SR opportunity and transmits the SCI using a new SCI Format. For example, this may be SCI Format X which only carries the 1 or 2 bits SR indication. As these SR opportunities have been assigned by the Scheduler-UE, it knows the identity of the UE sending the SR indication.

The Scheduling Request (SR) is used for requesting SL-SCH resources for new transmission.

The MAC entity may be configured with zero, one, or more SR configurations. An SR configuration consists of a set of resources for SR across different BWPs and cells. For a logical channel, at most one resource for SR is configured per BWP.

Each SR configuration corresponds to one or more logical channels. Each logical channel may be mapped to zero or one SR configuration, which is configured by Scheduler-UE. The SR configuration of the logical channel that triggered the BSR is considered as corresponding SR configuration for the triggered SR.

Scheduler-UE configures the following parameters for the scheduling request procedure:

SR Period: time between SR opportunities

SR Resource: Specific resource assigned to UE for transmission of the Scheduling Request sr-ProhibitTimer (per SR configuration);

sr-TransMax (per SR configuration).

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a BSR MAC control element which contains buffer status up to (and including) the last event that triggered a BSR prior to the MAC PDU assembly. All pending SR(s) shall be cancelled and each respective sr-ProhibitTimer shall be stopped when the SL grant(s) can accommodate all pending data available for transmission.

As long as at least one SR is pending, the MAC entity shall for each pending SR:

1> if the MAC entity has no valid resource configured for the pending SR:

2> initiate a Random Access procedure and cancel the pending SR.

1> else, for the SR configuration corresponding to the pending SR:

2> when the MAC entity has an SR transmission occasion on the valid resource for SR configured; and 2> if sr-ProhibitTimer is not running at the time of the SR transmission occasion; and 2> if the resource for the SR transmission occasion does not overlap with a measurement gap; and
2> if the resource for the SR transmission occasion does not overlap with a SL-SCH resource:
3> if SR_COUNTER<sr-TransMax:
4> increment SR_COUNTER by 1;
4> instruct the physical layer to signal the SR on one valid resource for SR;
4> start the sr-ProhibitTimer.

Note that the above text refers to the set of resources for SR transmission. These resource may be over PSCCH physical channel or the PSFCCH physical channel.

Option 2: Configuration of Shared SR Opportunities/Resources

The Scheduler-UE may configure the UE with one or more of the following SR transmission parameters:

SR Resources: List/Pool of resources that are reserved for SR transmission

SR Period: Time where the SR resources reserved for SR transmission repeat. For example, "SR Resources" may identify 5 resources reserved for SR transmission, while "SR Period" denotes that these resources are reserved every K sub-frames SR Tx Probability: Probability that UE will use to select a resource for SR transmission from the reserved pool.

SR Timer: The timer after which the UE will assume that the prior SR has been lost and retry to send a new SR. The timer is stopped on reception of a scheduled resource to send the BSR.

An example procedure is described below. If a UE needs to send an SR to the UE_S, it waits for the next resource reserved for SR transmission (from the reserved pool), and UE transmits the SR with probability "SR Tx Probability".

If successful, UE transmits the SCI using a new SCI Format. For example, this may be SCI Format Y, which carries the 1 or 2 bits SR indication as well as the identity of the UE. UE also starts the SR Timer. If this timer expires without a resource assignment, the UE restarts the procedure.

If unsuccessful, UE waits for the next resource reserved for SR transmission and tries again.

Option 3: Scheduler-UE Polls the UEs

In this option, the Scheduler-UE sequentially polls each of the UEs that it is scheduling and which do not have sidelink data radio bearers with the Scheduler-UE. The poll message may be carried in a new SCI format. For example, this may be SCI Format Z, which carries the 1 or 2 bit SR poll indication as well as the identity of the UE being polled.

UE determines that the polling message is destined for it. If the UE has a pending SR, it sends the SR using a new SCI format (for example the SCI Format X from Option1). Alternatively, if the UE has a pending BSR to send, it may directly send the BSR in response to the polling message (skipping the step of sending an SR). The resource to use to transmit the SCI or the BSR may be configured by the Scheduler-UE. The configuration may include a list of resources to use to transmit the SCI or BSR. The polling message may include an index to this list, which points to the specific resource that the UE should use. Alternatively, the resource to use to transmit the SCI or the BSR, may be related to a fixed time offset and/or fixed frequency offset from the resource used to carry the polling message. These offsets may also be configured by the Scheduler-UE.

Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications which may consist of V2V, V2I, V2N or V2P communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 21:
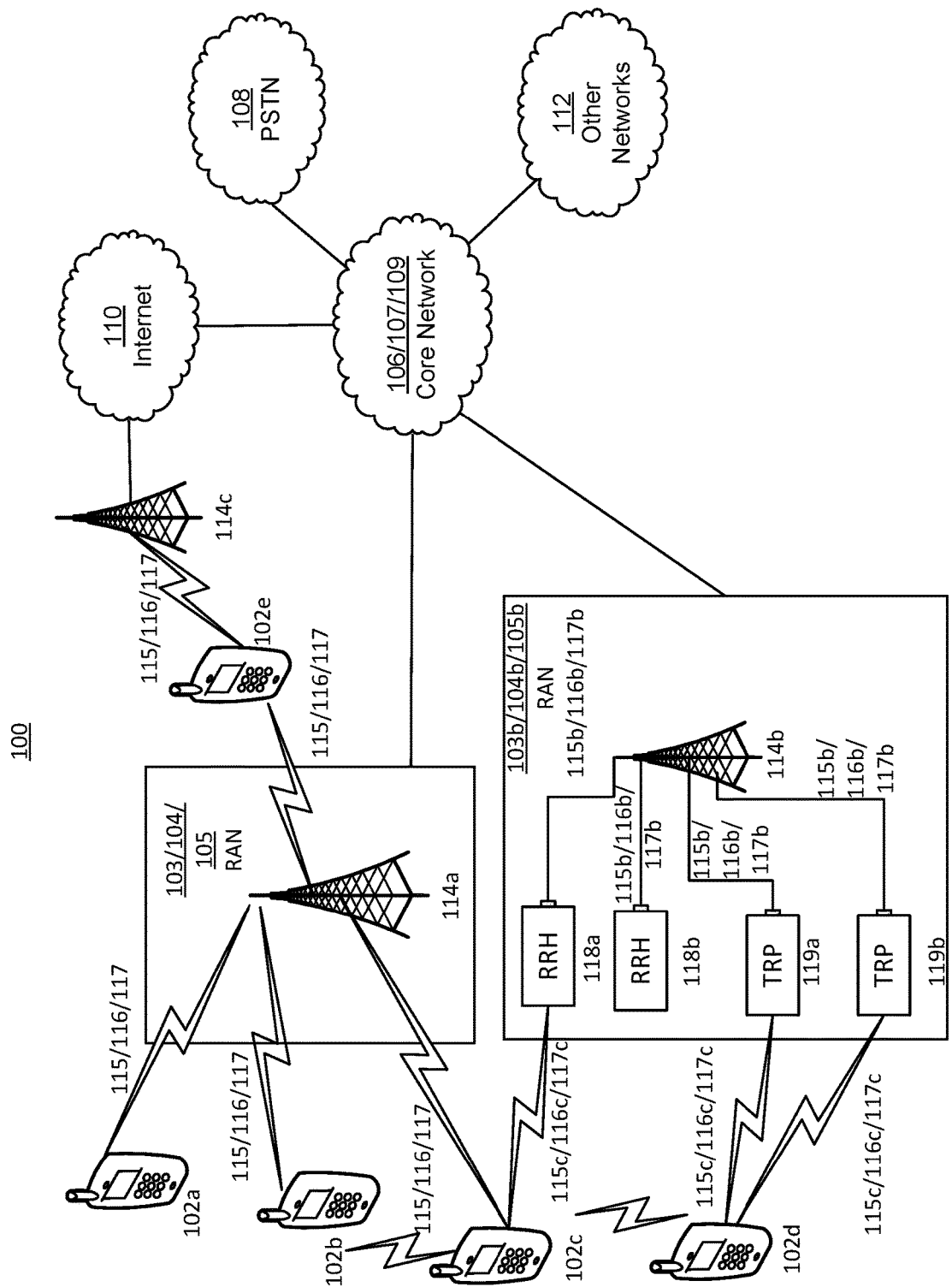
FIG. 21 illustrates one embodiment of an example communications system in which the methods and apparatuses described and claimed herein may be embodiment.

FIG. 21 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 21 and 23-25 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 21 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 21, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 21, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 21 may be configured to communicate with the base station 114*a*, which may employ a cellular-based radio technology, and with the base station 114*c*, which may employ an IEEE 802 radio technology.

Figure 22:
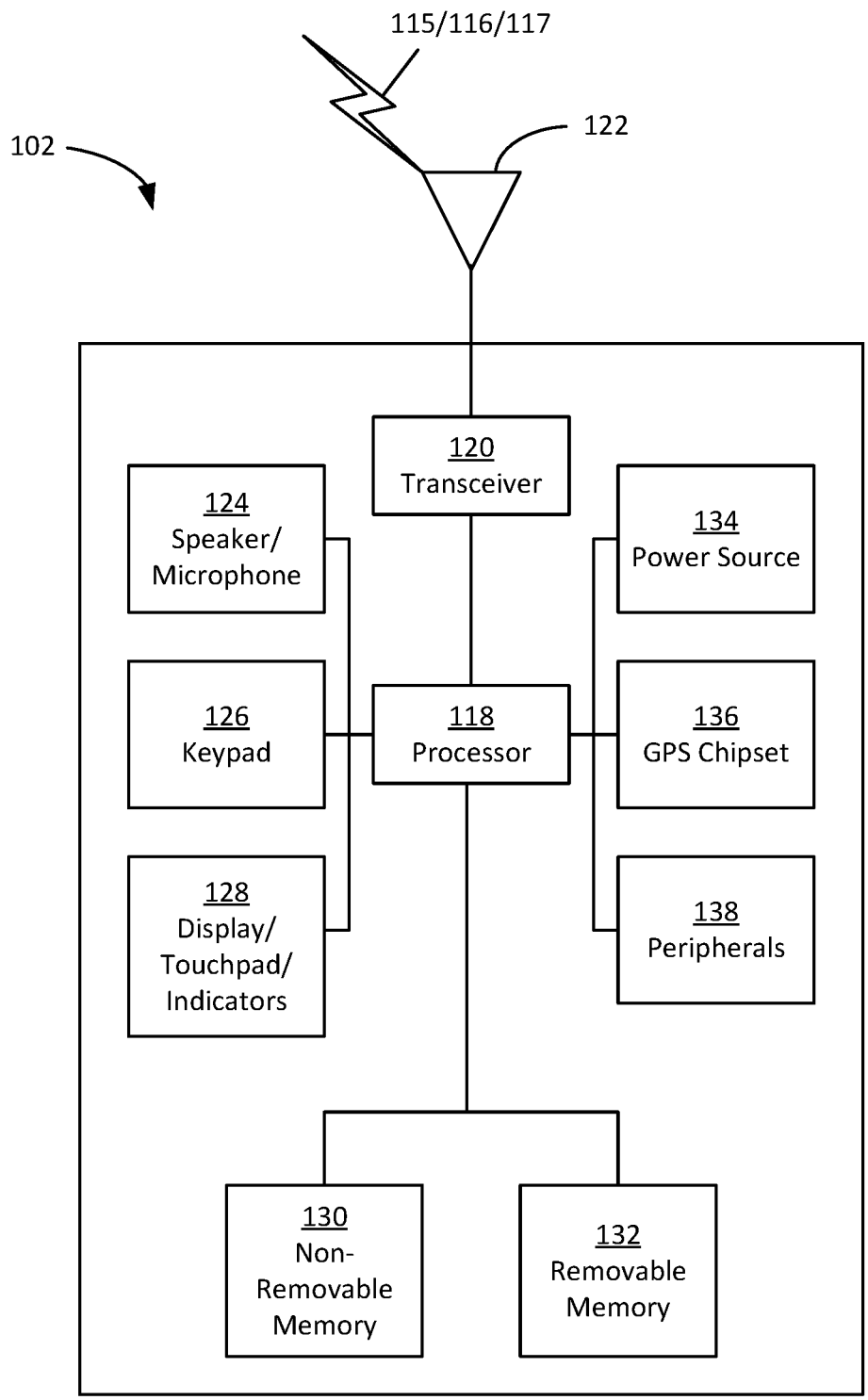
FIG. 22 is a block diagram of an example apparatus or device configured for wireless communications in accordance with the embodiments illustrated herein.

FIG. 22 is a block diagram of an example apparatus or device configured for wireless communications in accordance with the embodiments illustrated herein, such as for example, a WTRU 102. As shown in FIG. 22, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 22 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 22 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 22 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 23:
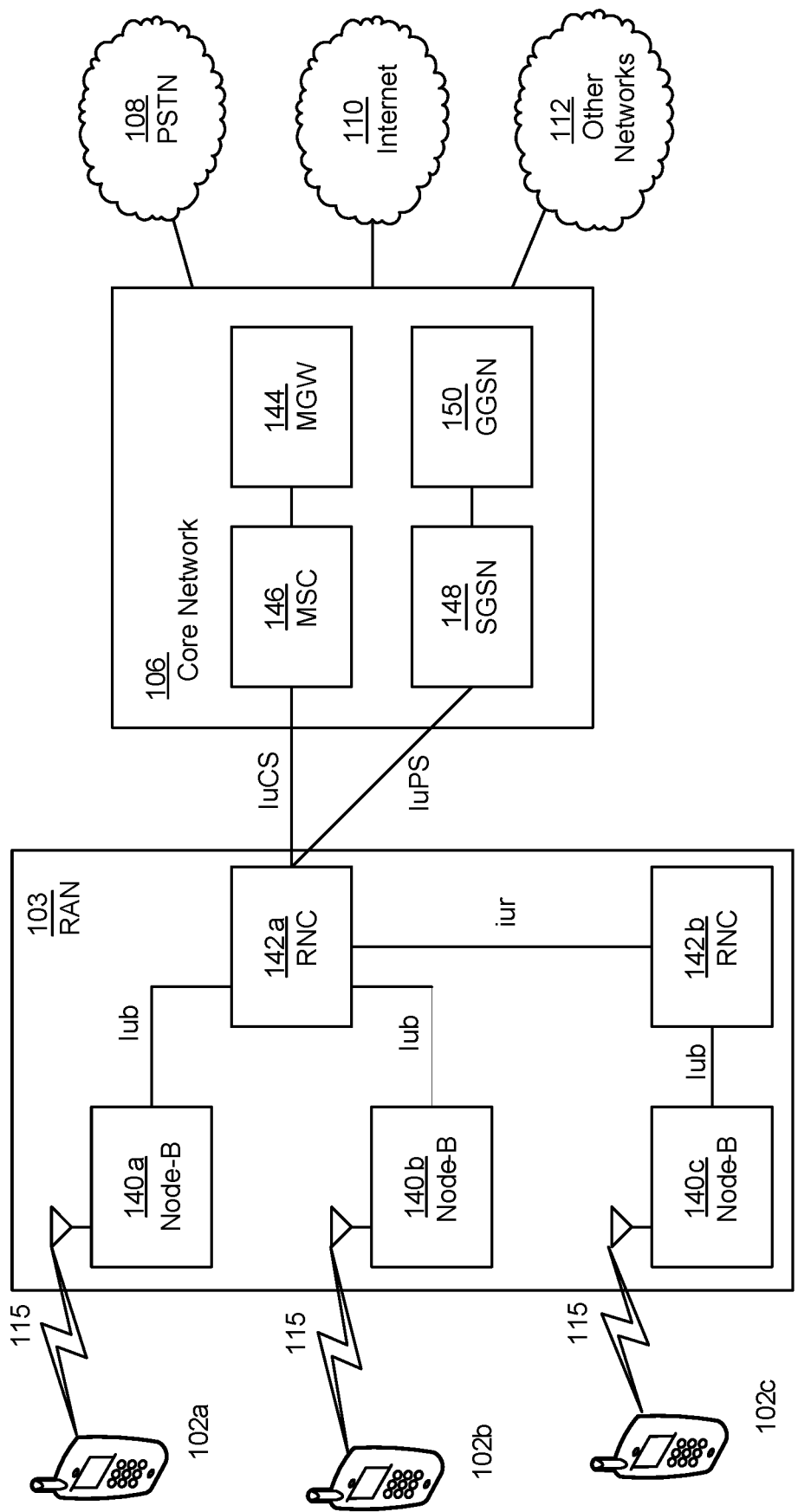
FIG. 23 is a system diagram of the RAN and the core network according to an embodiment.

FIG. 23 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 23, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 23, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 23 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 24:
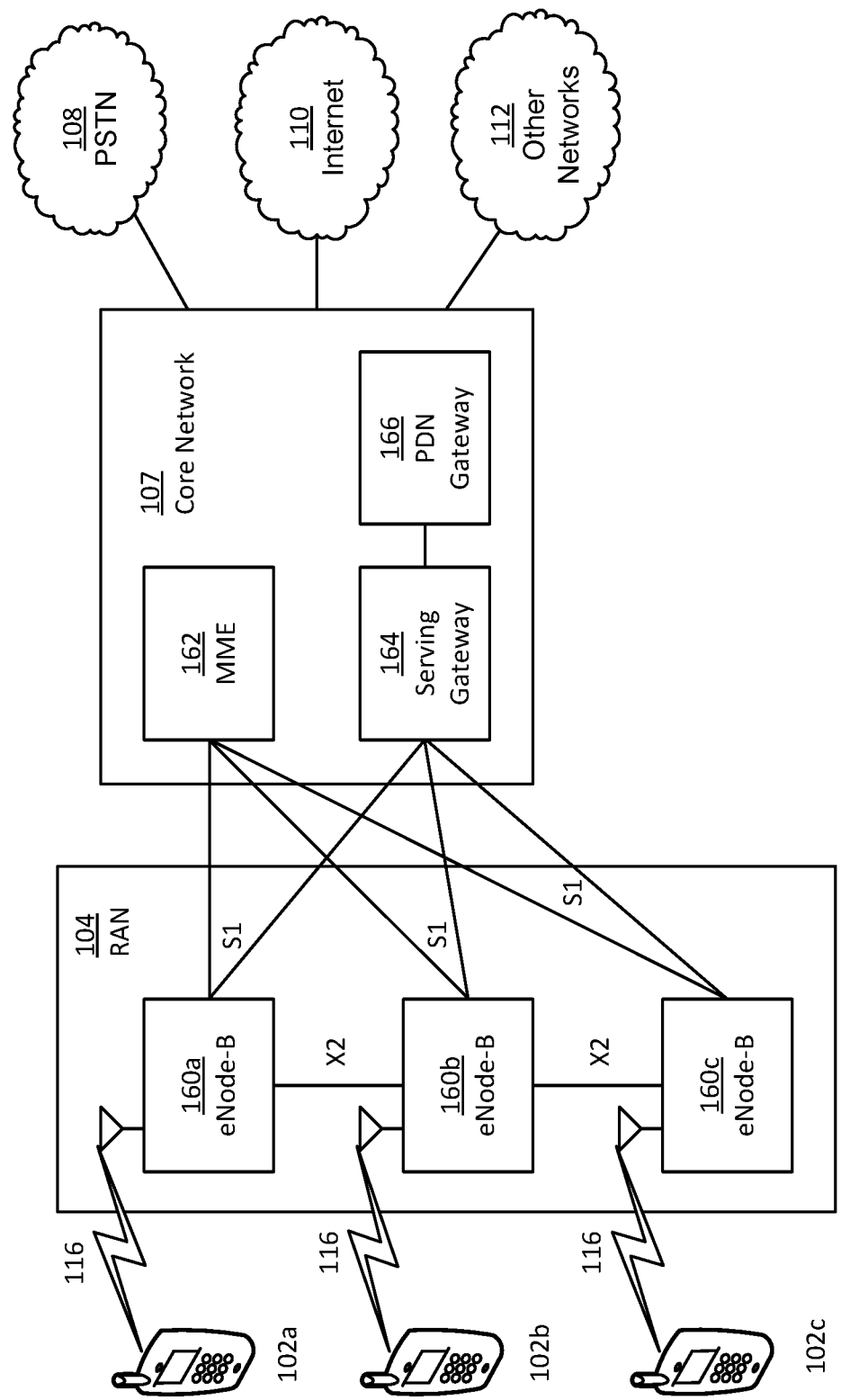
FIG. 24 is a system diagram of the RAN and the core network according to another embodiment.

FIG. 24 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 24, the eNode-Bs 160a, 160b, 160c may communicate with one another over an X2 interface.

The core network 107 shown in FIG. 24 may include a mobility management gateway (MME) 162, a serving gateway 164, and a packet data network (PDN) gateway 166.

While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, and 102c, and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, and 102c, and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 25:
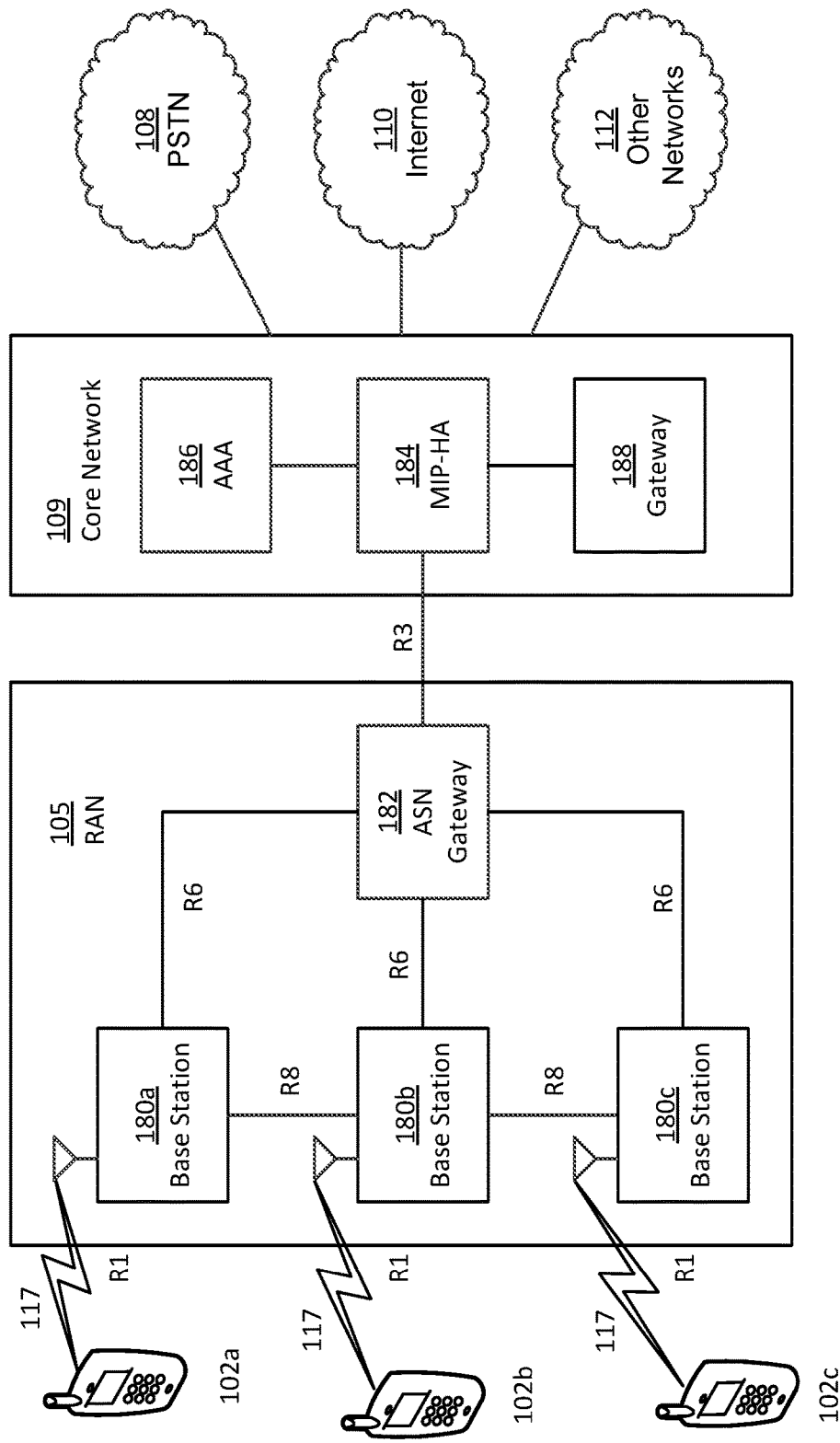
FIG. 25 is a system diagram of the RAN and the core network according to yet another embodiment.

FIG. 25 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 25, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 25, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, and 102c, and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, and 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 25, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 21 and 23-25 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 21 and 23-25 are provided by way of example only, and it is understood that the subject matter disclosed and claimed herein may be embodied or implemented in any similar communication system, whether presently defined or defined in the future.

Figure 26:
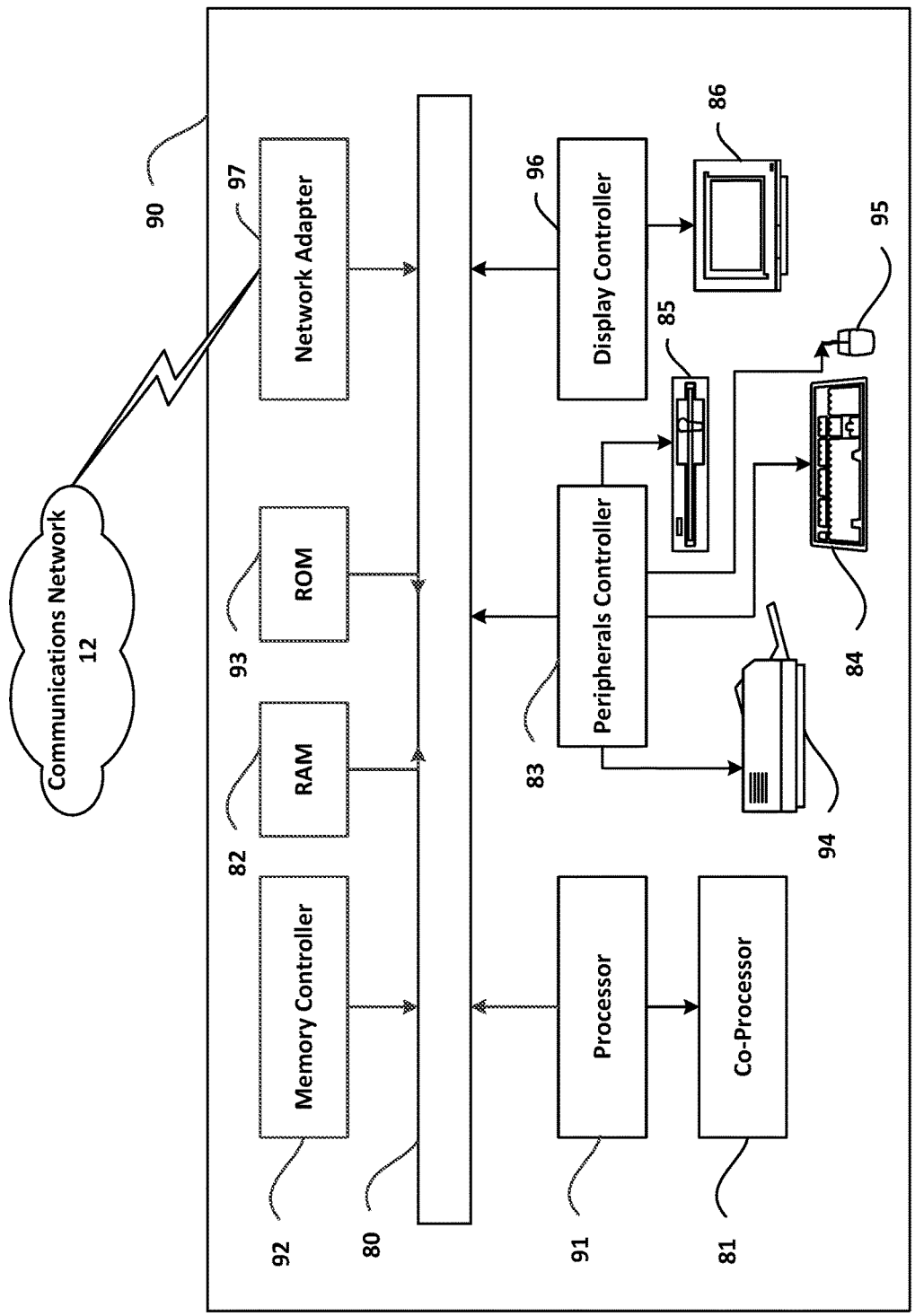
FIG. 26 is a block diagram of an example computing system in which one or more apparatuses of the communications networks illustrated in FIGS. 21, and 23-25 may be embodied.

FIG. 26 is a block diagram of an exemplary computing system 90 in which one or more apparatuses of the communications networks illustrated in FIGS. 21 and 23-25 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 21 and 23-25, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

We claim:

1. A first apparatus comprising a processor, a memory, and communication circuitry, the first apparatus being connected to a network via the communication circuitry, the first apparatus further comprising computer-executable instructions stored in the memory which, when executed by the processor, cause the first apparatus to perform operations comprising:

determining whether conditions for requesting a resource grant are met, comprising determining the availability of resource grants for use in sidelink communication between the first apparatus and a third apparatus; and if the conditions for requesting a resource grant are met, sending to a second apparatus a first request for a sidelink communications resource grant, the first request for a sidelink communications resource grant being for communications between the first apparatus and the third apparatus, wherein the first request for a sidelink communication resource grant comprises a request for configuration information for another request for a sidelink communication resource grant, and wherein the instructions further cause the first apparatus to:

receive, from the second apparatus, configuration information, the configuration information pertaining to the first request for a sidelink communications resource grant;

receive, in response to the first request for a sidelink communications resource grant, a resource configuration for a second request for a sidelink communications resource grant; and send, to the second apparatus, a second request for a sidelink communications resource grant, wherein the configuration information comprises information regarding one or more shared sidelink communication resource grant request resources, and wherein the configuration comprises:

information regarding a pool of resources that are reserved for sidelink communication resource grant request transmission;

information regarding a probability, the information regarding probability being used by the first apparatus in determining whether to use the one or more shared sidelink communication resource grant request resources; and a wait timer parameter, the wait time parameter being used by the first apparatus to evaluate whether a sidelink communication resource grant request transmission has failed.

2. The first apparatus of claim 1, wherein the first request for a sidelink communications resource grant comprises information related to a status of data buffered for transmission between the first apparatus and the third apparatus.

3. The first apparatus of claim 2, wherein the first request for a sidelink communications resource grant comprises one or more of: a destination layer-2 identity of the first apparatus; a destination layer-2 identity of the second apparatus; a destination layer-2 identity of the third apparatus; an identity of a logical channel; a logical channel group of a buffer; a buffer size; and a duplicate buffer size.

4. The first apparatus of claim 1, wherein the requesting resource grant comprises transmitting a Sidelink Buffer Status Report (BSR) over a Medium Access Control (MAC) Control Element.

5. The first apparatus of claim 1, wherein the request for a sidelink communications resource grant is included in a Medium Access Control (MAC) Control Element (CE) using a reserved logical channel identifier.

6. The first apparatus of claim 1, wherein the configuration information is carried over Radio Resource Control (RRC) signaling.

7. The first apparatus of claim 1, wherein the first request for a sidelink communications resource grant comprises a sidelink Scheduling Request (SR).

8. The first apparatus of claim 1, wherein the second request for a sidelink communications resource grant comprises a sidelink Scheduling Request (SR) or a sidelink Buffer Status Report (BSR).

9. The first apparatus of claim 1, wherein the first requested resource grant is transmitted on a new Sidelink Control Information (SCI) format that carries the SR and optionally the identity of the first apparatus.

10. The first apparatus of claim 1, wherein a received resource configuration for sidelink communications resource grant request for communication between the first apparatus and the third apparatus is different from a resource configuration for communication resource grant request for communication between the first apparatus and the second apparatus.

11. The first apparatus of claim 1, wherein a received resource configuration for sidelink communications resource grant request for communication between the first apparatus and the third apparatus comprises Quality of Service (QoS) level information for each of a plurality of QoS levels required for communication between the first apparatus and the third apparatus.

12. A first apparatus comprising a processor, a memory, and communication circuitry, the first apparatus being connected to a network via the communication circuitry, the first apparatus further comprising computer-executable instructions stored in the memory which, when executed by the processor, cause the first apparatus to perform operations comprising:

determining whether conditions for requesting a resource grant are met, comprising determining the availability of resource grants for use in sidelink communication between the first apparatus and a third apparatus; and if the conditions for requesting a resource grant are met, sending to a second apparatus a first request for a sidelink communications resource grant, the first request for a sidelink communications resource grant being for communications between the first apparatus and the third apparatus, wherein the first request for a sidelink communication resource grant comprises a request for configuration information for another request for a sidelink communication resource grant, and wherein the instructions further the first apparatus to:

receive, from the second apparatus, configuration information, the configuration information pertaining to the first request for a sidelink communications resource grant;

receive, in response to the first request for a sidelink communications resource grant, a resource configuration for a second request for sidelink communications resource grant;

send, to the second apparatus, a second request for a sidelink communications resource grant, wherein the configuration information comprises information regarding polled sidelink communication resource grant request resources, and wherein the configuration comprises an indication of how to determine which resources to use for transmitting the request for sidelink communication resource grant, said transmission occurring when the second apparatus may poll the first apparatus to see whether the first apparatus has a need to send a first request for a sidelink communications resource grant.

13. The first apparatus of claim 12, wherein the first request for a sidelink communications resource grant comprises information related to a status of data buffered for transmission between the first apparatus and the third apparatus.

14. The first apparatus of claim 12, wherein the first request for a sidelink communications resource grant comprises one or more of: a destination layer-2 identity of the first apparatus; a destination layer-2 identity of the second apparatus; a destination layer-2 identity of the third apparatus; an identity of a logical channel; a logical channel group of a buffer; a buffer size; and a duplicate buffer size.

15. The first apparatus of claim 12, wherein the first request for a sidelink communications resource grant comprises a sidelink Scheduling Request (SR).

16. The first apparatus of claim 12, wherein the second request for a sidelink communications resource grant comprises a sidelink Scheduling Request (SR) or a sidelink Buffer Status Report (BSR).

* * * * *